(12) United States Patent
Ito et al.

(10) Patent No.: US 8,018,670 B1
(45) Date of Patent: Sep. 13, 2011

(54) EVALUATION APPARATUS

(75) Inventors: Kiyotada Ito, Kanagawa-ken (JP); Makoto Horisaki, Kanangawa (JP)

(73) Assignee: Marvell International Ltd., Hamilton (BM)

( * ) Notice: Subject to any disclaimer, the term of this patent is extended or adjusted under 35 U.S.C. 154(b) by 132 days.

(21) Appl. No.: 12/582,787

(22) Filed: Oct. 21, 2009

Related U.S. Application Data

(60) Provisional application No. 61/108,902, filed on Oct. 28, 2008.

(51) Int. Cl.
*G11B 27/36* (2006.01)
(52) U.S. Cl. .......................... 360/31; 702/109
(58) Field of Classification Search ........................ None
See application file for complete search history.

(56) References Cited

U.S. PATENT DOCUMENTS

| | | | | |
|---|---|---|---|---|
| 5,812,336 | A * | 9/1998 | Spurbeck et al. | 360/51 |
| 6,594,094 | B2 * | 7/2003 | Rae et al. | 360/25 |
| 2006/0291088 | A1 * | 12/2006 | Atsumi et al. | 360/77.02 |
| 2009/0204355 | A1 * | 8/2009 | Vold | 702/108 |

* cited by examiner

*Primary Examiner* — Jason C Olson

(57) ABSTRACT

An evaluation apparatus for evaluating a transfer characteristic of a controlled object of a controller is disclosed. The evaluation apparatus includes a response detection section that detects an input/output response of a control system, based on a signal detected in the control system. The control system includes the controller and the controlled object. The evaluation apparatus further includes a transfer characteristic calculating section that calculates the transfer characteristic of the controlled object, based at least on the input/output response.

13 Claims, 18 Drawing Sheets

EVALUATION APPARATUS

CROSS REFERENCE TO RELATED APPLICATIONS

This application claims the benefit of priority from U.S. Provisional Application No. 61/108,902 entitled "Practical Identification Technique Over the Nyquist Frequency" filed Oct. 28, 2008, the disclosure of which is incorporated herein by reference in its entirety.

BACKGROUND

A disk apparatus such as a hard disk apparatus may have an inaccurate head positioning signal attributable to mechanical resonance of the head positioning mechanism or the like. In a system where the head positioning process is controlled in discrete time, when a disturbance component of a frequency equal to or greater than a Nyquist frequency is applied, a sampled head positioning signal may cause an aliasing component to appear. Depending on the type of frequency region where the aliasing component appears, the aliasing component may cause adverse effect on the head positioning control.

SUMMARY

An evaluation apparatus for evaluating a transfer characteristic of a controlled object of a controller is disclosed. The evaluation apparatus includes a response detection section that detects an input/output response of a control system, based on a signal detected in the control system. The control system includes the controller and the controlled object. The evaluation apparatus further includes a transfer characteristic calculating section that calculates the transfer characteristic of the controlled object, based at least on the input/output response. The controller receives an error between a detection value of a controlled variable sampled at a predetermined sampling frequency and a desired value of the controlled variable, and outputs a manipulated variable of the controlled object at an output frequency higher than the sampling frequency. The controlled object is supplied with a disturbance added signal resulting from adding a disturbance signal having a frequency higher than a Nyquist frequency of the sampling frequency to a signal of the manipulated variable. The response detection section detects the input/output response of the control system in an aliasing frequency to which a frequency component of the disturbance signal is folded by sampling at the sampling frequency, based on input/output signals of the output frequency detected with a signal including the disturbance signal as an input and a signal including the response of the controlled object as an output. The transfer characteristic calculating section calculates a transfer characteristic of the controlled object in the aliasing frequency, at least based on an input/output response in the aliasing frequency.

DETAILED DESCRIPTION

Figure 1:
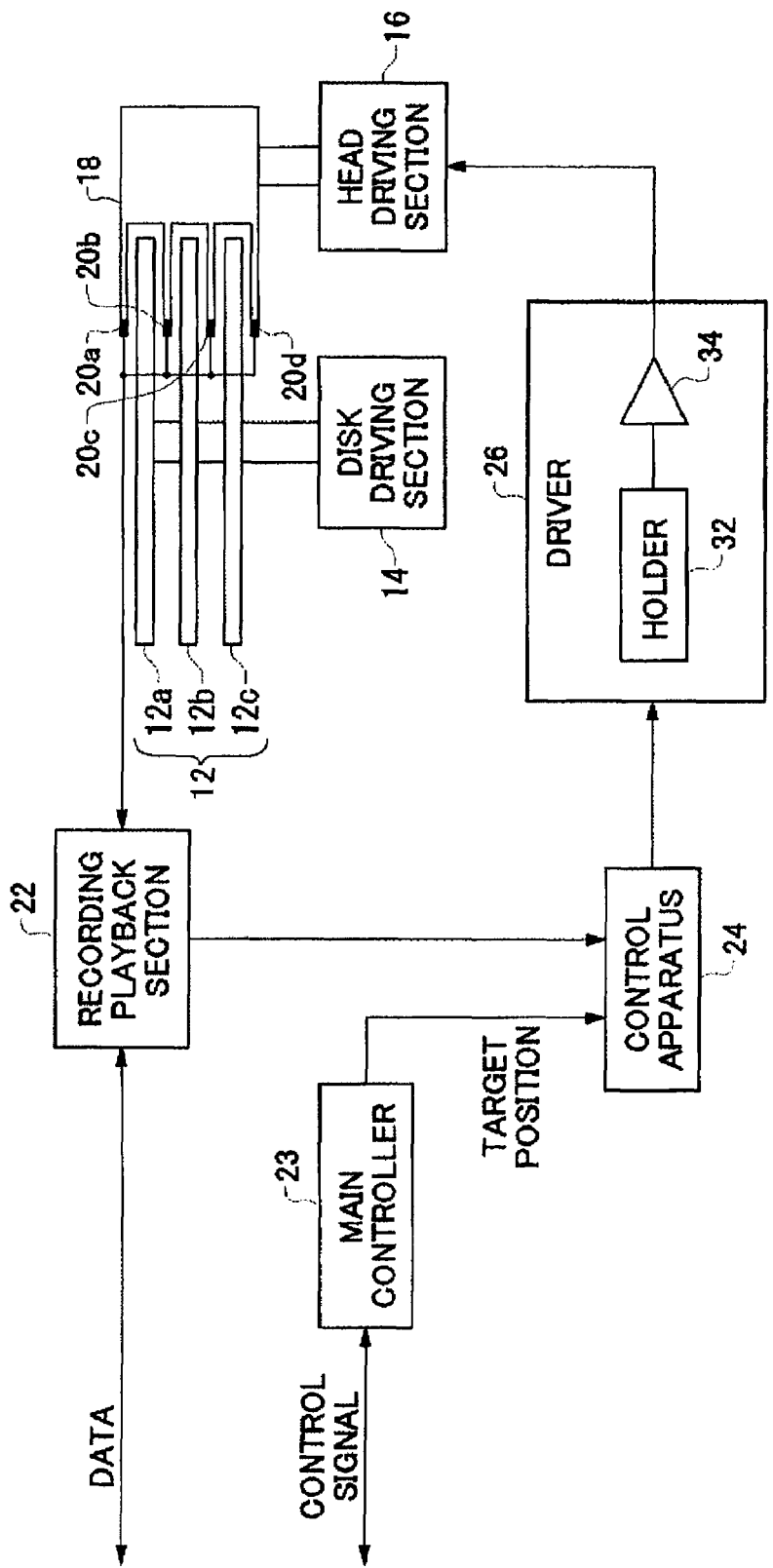
FIG. 1 shows an overall configuration of a disk apparatus according to an embodiment.

FIG. 1 shows an overall configuration of a disk apparatus 10 according to an embodiment. The disk apparatus 10 includes a disk 12, a head 20, a disk driving section 14, a head driving section 16, a plurality of disks 12a-c, a head assembly 18 including a plurality of heads 20a-d, a recording playback section 22, a main controller 23, a control apparatus 24, and a driver 26. Hereinafter, the plurality of disks 12a-c are occasionally collectively referred to as a disk 12. Moreover, the plurality of heads 20a-d are occasionally collectively referred to as a head 20.

The disk 12 may be a recording medium having a disk-shaped surface to which data is magnetically or optically written. The head 20 magnetically or optically writes data onto the disk 12. The head 20 magnetically or optically reads data from the disk 12.

The head assembly 18 supports the head 20. The head assembly 18 is rotated around a predetermined axis by the head driving section 16, according to which the head 20 moves over the disk 12. The head driving section 16 rotates the head assembly 18 around the predetermined axis at the acceleration speed according to an input signal representing a manipulated variable, thereby controlling the position of the head 20 to the vicinity of a target position on a surface of the disk 12. The movable side of the head driving section 16 is provided with a coil portion of a voice coil motor (VCM), and the casing of the head driving section 16 is provided with a permanent magnet of the voice coil motor (VCM). Supply of a power current to the coil portion from the driver 26 generates a driving force for rotating the head assembly 18.

The control apparatus 24 outputs a signal representing the manipulated variable to the driver 26. The control apparatus 24 outputs to the driver 26 a signal corresponding to the acceleration speed of the head assembly 18. In particular, a signal representing a power current supplied by the driver 26 to the head driving section 16 is supplied to the driver 26. In this way, the position of the head 20 on the surface of the disk 12 is controlled by the control apparatus 24.

The head positioning control performed by the control apparatus 24 includes control for settling the head 20 to a target position. The head 20 is positioned under the control of the control apparatus 24, until the reading and writing of data in the target position is complete. A position signal representing the position of the head 20 is supplied to the control apparatus 24 from the recording playback section 22. A target position signal representing a target position of the head 20 is supplied to the control apparatus 24 from the main controller 23.

The main controller 23 obtains a read address or a write address of data, in response to a control instruction received from a host computer or the like. The main controller 23 calculates the target position of the head 20 based on the read address or the write address of the data, and outputs a target position signal representing the calculated target position to the control apparatus 24.

The recording playback section 22 obtains a signal representing servo information which the head 20 has read from the disk 12, and calculates the position of the head 20 on the surface of the disk 12. The recording playback section 22 outputs a position signal representing the calculated position of the head 20 to the control apparatus 24. For example, the servo information may be recorded onto the disk 12 in a data surface servo method. To be more specific, each track of the disk 12 includes a plurality of data regions to which data can be written and a plurality of servo regions on which servo information has been written. The servo regions are arranged with a predetermined interval therebetween in each track. Burst information, which is an example of the servo information, is written in the servo regions.

The head 20 reads the servo regions and the data regions of the tracks, while the disk driving section 14 is rotating the disk 12 at a predetermined rotation speed. The head 20 generates burst signals obtained by reading the servo regions and data signals obtained by reading the data regions alternately in predetermined time intervals. The burst signals and the data signals generated by the head 20 are outputted to the recording playback section 22.

The recording playback section 22 generates a position signal representing the position of the head 20 in a track based on, for example, the amplitude of a burst signal, and supplies the position signal to the recording playback section 22. Since the servo regions in a track are arranged with a predetermined interval therebetween, and the disk 12 is rotated at a substantially constant rotation speed, the position signal inputted to the control apparatus 24 is a discrete-time signal sampled at predetermined sampling periods.

The control apparatus 24 generates a discrete-time manipulated variable signal, for controlling the driver 26 based on the discrete-time position signal received from the recording playback section 22. Specifically, the control apparatus 24 generates a manipulated variable signal of an output period higher than an input period of the position signal by a multi-rate control, using the position signal from the recording playback section 22 and the target position signal from the main controller 23. The control apparatus 24 outputs the generated manipulated variable signal to the driver 26. The controlling performed by the control apparatus 24 is explained later in greater detail with reference to FIG. 2.

The driver 26 includes a holder 32 and a power amplifier 34. The holder 32 generates a continuous-time control signal by holding the inputted discrete-time manipulated variable signal and outputs the generated continuous-time control signal to the power amplifier 34. The power amplifier 34 supplies the power current corresponding to the continuous-time control signal to the head driving section 16.

The above description focuses on the control of the head driving section 16. The control apparatus 24 may control the rotation speed of the disk driving section 14. In addition, the recording playback section 22 may decode data written on the disk 12 based on the data signal from the head 20, and transfer the decoded data to the host computer. In addition, the recording playback section 22 may code the data transferred from the host computer to generate a signal to be written to the disk 12 and output the generated signal to the head 20. In addition, the control apparatus 24 may be implemented within the main controller 23.

Figure 2:
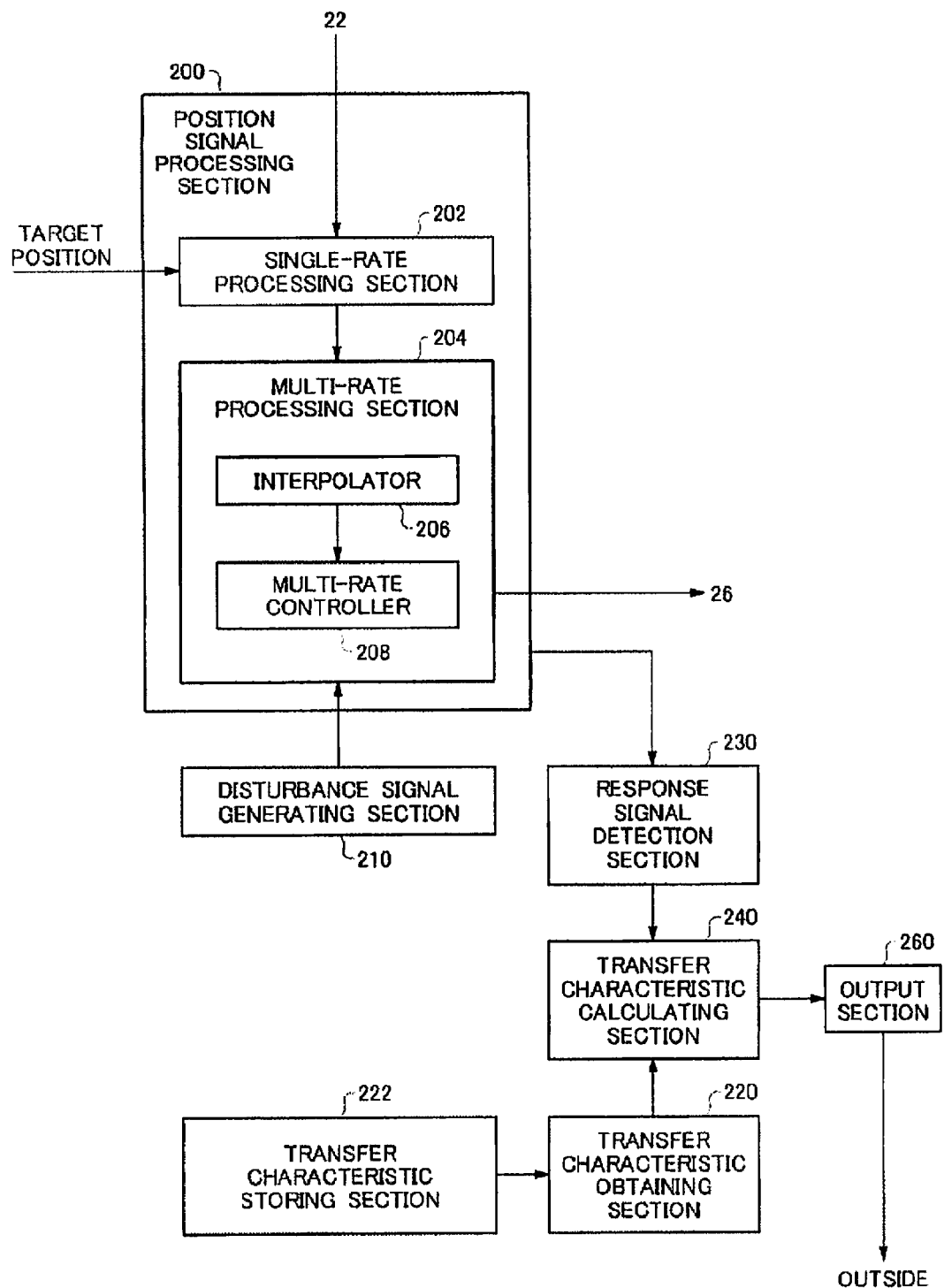
FIG. 2 shows an exemplary block configuration of a control apparatus.

FIG. 2 shows an exemplary block configuration of the control apparatus 24. The control apparatus 24 includes a position signal processing section 200, a disturbance signal generating section 210, a transfer characteristic obtaining section 220, a transfer characteristic storing section 222, a response detection section 230, a transfer characteristic calculating section 240, and an output section 260. The position signal processing section 200 includes a single-rate processing section 202 and a multi-rate processing section 204.

The single-rate processing section 202 obtains a position signal and a target position signal. The position signal is a signal of a predetermined frequency sampled at the predetermined sampling periods mentioned above. The single-rate processing section 202 performs signal processing at the predetermined frequency. The single-rate processing section 202 generates an error signal representing an error between the target position signal and the position signal, and generates a signal to be outputted to the multi-rate processing section 204 according to the error signal. The single-rate processing section 202 may output a signal of the frequency that is identical to the frequency of the position signal. The single-rate processing section 202 may output the error signal itself to the multi-rate processing section 204, or may output a signal obtained by performing a predetermined process according to the error signal, to the multi-rate processing section 204.

The multi-rate processing section 204 includes an interpolator 206 and a multi-rate controller 208. The interpolator 206 converts the signal inputted from the single-rate processing section 202 into a signal of a frequency higher than the frequency of the position signal. The multi-rate controller 208 generates a manipulated variable signal to be supplied to the driver 26, based on the signal resulting from the conversion of the interpolator 206. In this way, the position signal processing section 200 generates a manipulated variable signal by the multi-rate control.

In this way, the multi-rate processing section 204 generates the manipulated variable signal, based on the error signal generated by upsampling the error. As explained above, the position signal processing section 200 performs processing of the multi-rate control. For example, the position signal processing section 200 receives an error between a detection value of a controlled variable sampled at a predetermined sampling frequency and a desired value of the controlled variable, and outputs the manipulated variable signal of the control apparatus 24 with respect to the controlled variable, at an output frequency higher than the sampling frequency.

In an embodiment, in a first operation mode of the disk apparatus 10, the position signal processing section 200 supplies a manipulated variable signal to the driver 26. In a second operation mode of the disk apparatus 10, for measuring the transfer characteristic of the head assembly 18 being a controlled object, the position signal processing section 200 supplies to the driver 26 a disturbance added signal obtained by adding a disturbance signal to the manipulated variable signal. In this way, a controlled object is supplied with a disturbance added signal resulting from adding, to a manipulated variable signal, a disturbance signal of a frequency higher than a Nyquist frequency of the sampling frequency. The disturbance signal of a frequency higher than the Nyquist frequency may represent a signal the main frequency component of which resides in a frequency band higher than the Nyquist frequency.

Specifically, the disturbance signal may be a signal corresponding to a sine wave of a frequency exceeding the Nyquist frequency. Accordingly, the disturbance added signal is generated by adding, to a manipulated variable signal, the disturbance signal corresponding to the sine wave of a frequency exceeding the Nyquist frequency.

In the present embodiment, the controlled object may be the head assembly 18 that is a head apparatus including the head 20. The head 20 is fixed to an arm, to be integrally formed as the head assembly 18. The controlled variable corresponds to a position of the head 20 with respect to the disk 12.

As explained so far, the disk 12 includes, in each track, a plurality of servo regions recording thereon servo information at a predetermined interval. The head 20 outputs a reading signal by reading servo information recorded on each of the plurality of servo regions, while the disk 12 is rotated at a predetermined rotation speed. Accordingly, the position of the head 20 in the plurality of servo regions is detected at the predetermined sampling frequency, by being detected based on the reading signal of the servo information in each servo region. The sampling frequency is determined by the rotation speed of the disk 12 as well as the number of servo regions per track.

The transfer characteristic storing section 222 stores the transfer characteristic of a controller. The transfer characteristic storing section 222 stores at least the frequency response of the controller in the frequency domain exceeding the Nyquist frequency. The controller in the present embodiment may be the position signal processing section 200, and particularly the single-rate processing section 202 and the multi-rate processing section 204. The transfer characteristic storing section 222 may be implemented by a memory.

The transfer characteristic obtaining section 220 obtains the transfer characteristic of the controller. Specifically, the transfer characteristic obtaining section 220 obtains the transfer characteristic of the controller from the transfer characteristic storing section 222. Furthermore, the transfer characteristic obtaining section 220 obtains the transfer characteristic of the controller in the aliasing frequency to which the frequency component of the disturbance signal is folded by the sampling at the sampling frequency.

Then, the response detection section 230 detects an input/output response of a control system based on the signal detected in the control system including the controller and the controlled object. Specifically, the response detection section 230 detects the input/output response of the control system in the aliasing frequency based on the input/output signals of the output frequency detected with a signal including the disturbance signal as an input and a signal including the response of the controlled object as an output.

Then, the transfer characteristic calculating section 400 calculates the transfer characteristic of the controlled object, at least based on the input/output response. Specifically, the transfer characteristic calculating section 240 calculates the transfer characteristic of the controlled object in the aliasing frequency from the input/output response in the aliasing frequency. For example, the transfer characteristic calculating section 240 calculates the transfer characteristic of the controlled object, based on the input/output response and the transfer characteristic of the controller. Specifically, the transfer characteristic calculating section 240 calculates the transfer characteristic of the controlled object in the aliasing frequency, based on the transfer characteristic of the controller in the aliasing frequency as well as the input/output response in the aliasing frequency.

The response detection section 230 detects the input/output response in the aliasing frequency in one or more frequency bands that are higher than the Nyquist frequency. The response detection section 230 detects the input/output response in the aliasing frequency of the one or more frequency bands that are higher than the Nyquist frequency, other than the input/output response in the aliasing frequency of a frequency band lower than the Nyquist frequency. For example, the input/output response may be at least some of a plant response, an open loop characteristic, a sensitivity function, a closed loop characteristic, and a settling function.

Note that the functional blocks of the disturbance signal generating section 210, the transfer characteristic obtaining section 220, the transfer characteristic storing section 222, the response detection section 230, the transfer characteristic calculating section 240, and the output section 260 can function as an evaluation apparatus for evaluating the transfer characteristic of a controlled object which is controlled by the controller. The disturbance signal generating section 210, the transfer characteristic obtaining section 220, the transfer characteristic storing section 222, the response detection section 230, the transfer characteristic calculating section 240, and the output section 260 may be implemented as a single device together with the position signal processing section 200, or as a device separate from the position signal processing section 200. In addition, the disturbance signal generating section 210, the transfer characteristic obtaining section 220, the transfer characteristic storing section 222, the response detection section 230, the transfer characteristic calculating section 240, and the output section 260 may be implemented within the disk apparatus 10, or as an evaluation apparatus external to and independent from the disk apparatus 10.

Figure 3:
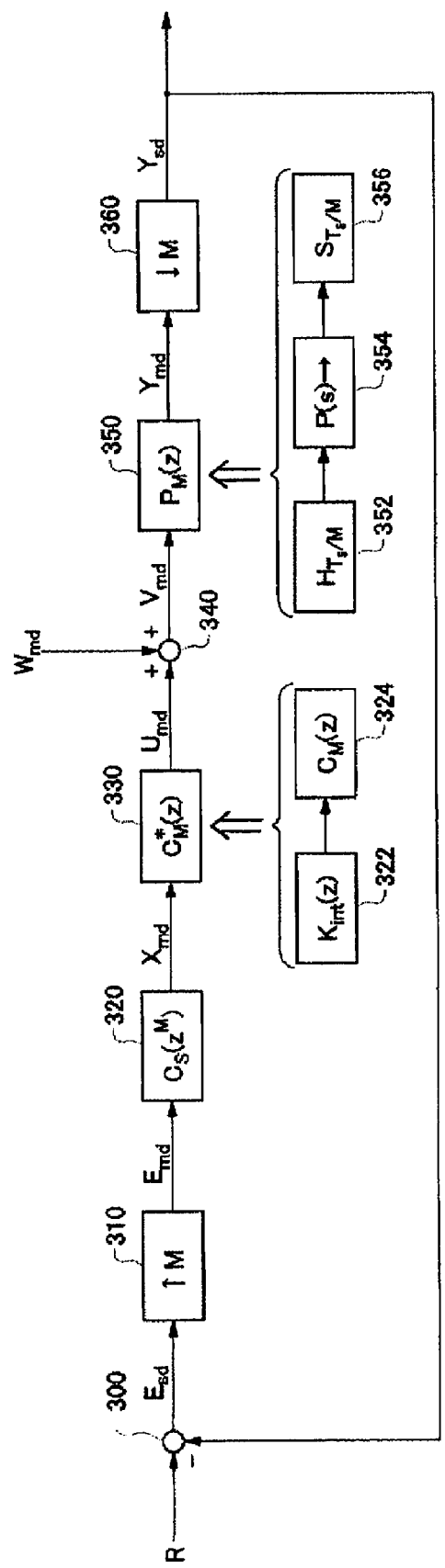
FIG. 3 shows an exemplary block diagram in a control system.

FIG. 3 shows an exemplary block diagram in a control system including the recording playback section 22, the control apparatus 24, the head driving section 16, and the head assembly 18. This control system is represented by an adding point 300, an operator 310, a transfer element 320, a transfer element 330, an adding point 340, a transfer element 350, and an operator 360.

As shown in FIG. 3, R represents a state variable corresponding to the target position signal of the head 20. $Y_{sd}$ represents a state variable corresponding to a sampled discrete-time position signal. $E_{sd}$ represents a state variable corresponding to an error signal between R and $Y_{sd}$ which is an operation result of the adding point 300. Here, $Y_{sd}$ and $E_{sd}$ correspond to a signal of a frequency domain of a position signal. The operator 310 upsamples the input of $E_{sd}$ and converts it into a signal output having a frequency corresponding to M times the frequency of $E_{sd}$.

The transfer element 320 is a transfer element of a controller portion that performs processing at the frequency domain of the position signal. The transfer function corresponding to the transfer element 320 is represented by $C_s(z^M)$ where $z^M$ represents an upsampled discrete time. The transfer element 320 converts the input $E_{md}$ into the output $X_{md}$. The transfer element 330 is a transfer element corresponding to a controller portion that performs processing at the upsampled frequency. The transfer element 330 converts the input $X_{md}$ into the output $U_{md}$.

The transfer function corresponding to the transfer element 330 is represented by $C^*_M(z)$. $C^*_M(z)$ is represented by a transfer function $K_{int}(z)$ as the transfer element 322 mainly corresponding to the interpolator 206 as well as a transfer function $C_m(z)$ as the transfer element 324 mainly corresponding to the function of the multi-rate controller 208. $U_{md}$ represents a state variable corresponding to the manipulated variable signal.

$W_{md}$ represents a state variable corresponding to a disturbance signal generated by the disturbance signal generating section 210 and supplied to the position signal processing section 200. $W_{md}$ is added to $U_{md}$ at the adding point 340, and outputted as $V_{md}$.

The transfer element 350 represents a transfer element corresponding to the controlled object of a continuous time. In the present embodiment, $P_M(z)$ is represented by a transfer function $R_{Ts/M}$ as the transfer element 352 mainly corresponding to the holder 32 converting a discrete time signal into a continuous time signal, P(s) as the transfer element 354 mainly corresponding to the head assembly 18 and the power amplifier 34 of a continuous time, and a transfer function $S_{Ts/M}$ as the transfer element 356 corresponding to the functional part converting a continuous-time position signal into a discrete-time position signal. $P_M(z)$ corresponds to a transfer function describing the controlled object in a continuous time system using a discrete time system. One example of the purpose of the present embodiment is to calculate the transfer function $P_M(z)$ in a frequency band exceeding the Nyquist frequency.

$Y_{md}$ is an output of a discrete time from $P_M(z)$. The operator 360 downsamples an input of $Y_{sd}$ into an output signal of 1/M frequency. The system from the output of the operator 310 to the input of the operator 360 is described in a discrete time system upsampled to M-fold. $U_{md}(z)$, $V_{md}(z)$, $Y_{md}(z)$, $Y_{sd}(z)$, and $E_{md}(z)$ can be represented in Expressions (1a)-(1e).

$$U_{md}(z) = C^*_M(z) C_S(z^M) \cdot E_{md}(z) \quad (1a)$$

$$V_{md}(z) = U_{md}(z) + W_{md}(z) \quad (1b)$$

$$Y_{md}(z) = P_M(z) \cdot V_{md}(z) \quad (1c)$$

$$Y_{sd}(z) = \frac{1}{M} \sum_{k=0}^{M-1} Y_{md}\left(e^{-j\frac{2k\pi}{M}} \cdot z^{\frac{1}{M}}\right) \quad (1d)$$

$$E_{md}(z) = -Y_{sd}(z^M) \quad (1e)$$

Figure 4:
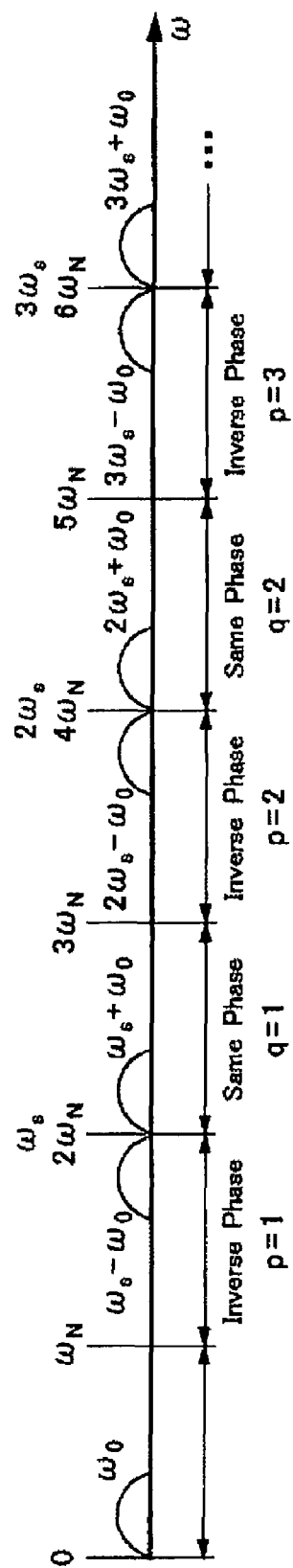
FIG. 4 shows a frequency in which an aliasing component appears.

FIG. 4 shows a frequency in which an aliasing component appears. $\omega_s$ represents an angular frequency corresponding to the sampling frequency where the position of the head 20 is sampled. $\omega_N$ represents an angular frequency corresponding to the Nyquist frequency determined by the sampling frequency.

Here, $Y_{sd}$ explained in relation to FIG. 3 corresponds to a signal resulting from downsampling $Y_{md}$. Hence, the $Y_{md}$ component in $\omega_s-\omega_0$, $\omega_s+\omega_0$, $2\omega_s-\omega_0$, $2\omega_s+\omega_0$, $3\omega_s-\omega_0$, $3\omega_s+\omega_0$, . . . is added, as an aliasing component, to the frequency component of $Y_{sd}$ in the angular frequency $\omega_0$ smaller than $\omega_N$, in addition to the $Y_{md}$ component in $\omega_0$. The $Y_{md}$ component in $\omega_s-\omega_0$, $2\omega_s-\omega_0$, and $3\omega_s-\omega_0$ is added in an inverse phase, and the $Y_{md}$ component in $\omega_s+\omega_0$, $2\omega_s+\omega_0$, and $3\omega_s+\omega_0$ is added in the same phase. Therefore, the angular frequency smaller than $\omega_N$ can be expressed as in the following expression.

$$Y_{sd}(e^{j\omega T_s}) = \frac{1}{M}\left\{Y_{md}(e^{j\omega_0 T_s/M}) + \sum_{p=1}^{P_N} \overline{Y_{md}(e^{j(p\omega_s-\omega_0)T_s/M})} + \sum_{q=1}^{N-1} Y_{md}(e^{j(q\omega_s+\omega_0)T_s/M})\right\} \quad (2)$$

Here, it is assumed that when M is an even number (M=2N), $P_N$=N, and when M is an odd number (M=2N−1), $P_N$=N−1. As shown in the above expression, $Y_{sd}$ can be represented as a summation of $P_N$+N frequency components of $Y_{md}$. Note that the frequency component of $Y_{md}$ exceeding the frequency band taken into consideration by the above expression is not added to $Y_{sd}$ as being negligible. Generally in the present embodiment, it is assumed that the high frequency component exceeding the Nyquist frequency, which is determined by the frequency upsampled to M-fold, is assumed to be negligible. For example, the effect of the mechanical resonance exceeding the Nyquist frequency on the position signal is assumed to be negligible. Thus, when M is an even number (M=2N), up to the frequency component of $N\omega_s-\omega_0$ is considered, while when M is an odd number (M=2N−1), up to the frequency component of $(N-1)\omega_s+\omega_0$ is considered.

Next, $E_{md}$ and $C_s$ in the upsampled frequency domain can be represented as in the following, using the frequency component in the downsampled frequency domain. First, in the frequency band where the angular frequency is smaller than $\omega_N$, $E_{md}$ and $C_s$ can be expressed in the following expression.

$$E_{md}(e^{j\omega T_s/M}) = -Y_{sd}(e^{j\omega_0 T_s}) \quad (3a)$$

$$C_s(e^{j\omega T_s/M \cdot M}) = C_s(e^{j\omega_0 T_s}) \quad (3b)$$

Second, in the inverse phase where the aliasing component is added in the inverse phase, i.e., in the frequency band where the angular frequency is $p\omega_s-\omega_0$, $E_{md}$ and $C_s$ can be expressed in the following expression. In the expression, note that p is an integer of 1–$P_N$.

$$E_{md}(e^{j\omega T_s/M}) = -Y_{sd}(e^{j(p\omega_s-\omega_0)T_s}) = -\overline{Y_{sd}(e^{j\omega_0 T_s})} \quad (4a)$$

$$C_s(e^{j\omega T_s/M \cdot M}) = C_s(e^{j(p\omega_s-\omega_0)T_s}) = \overline{C_s(e^{j\omega_0 T_s})} \quad (4b)$$

Third, in the same phase where the aliasing component is added in the same phase, i.e., in the frequency band where the angular frequency is $q\omega_s-\omega_0$, $E_{md}$ and $C_s$ can be expressed in the following expression. In the expression, note that q is an integer from 1 to N−1.

$$E_{md}(e^{j\omega T_s/M}) = -Y_{sd}(e^{j(q\omega_s+\omega_0)T_s}) = -Y_{sd}(e^{j\omega_0 T_s}) \quad (5a)$$

$$C_s(e^{j\omega T_s/M \cdot M}) = C_s(e^{j(q\omega_s+\omega_0)T_s}) = -C_s(e^{j\omega_0 T_s}) \quad (5b)$$

The following explains a method of calculating an unknown $P_M(z)$ using a state variable and a transfer function of a discrete time system in an upsampled frequency domain explained with reference to FIG. 3 and FIG. 4. An exemplary method to calculate $P_M(z)$ measures the input/output response of the system outputting $E_{md}$ using $V_{md}$ as an input. Specifically, $P_M(z)$ is calculated by measuring the plant response while a disturbance signal is added to a manipulated variable signal.

Other exemplary methods to calculate $P_M(z)$ measures an open loop characteristic, a sensitive function, a closed loop characteristic, or a settling function. These other methods are explained after explaining the method of calculating $P_M(z)$ by measuring the plant response as follows.

The measurable plant response for the angular frequency smaller than $\omega_N$ can be expressed by the following expression.

$$\frac{E_{md}(e^{j\cdot\omega T_S/M})}{V_{md}(e^{j\cdot\omega T_S/M})} = \frac{-\frac{1}{M}P_M(\omega_0)}{1+\frac{1}{M}\left\{\sum_{p=1}^{P_N}\overline{P_{Mp}(p,\omega_0)C^*_{Mp}(p,\omega_0)}+\sum_{q=1}^{N-1}P_{Mq}(q,\omega_0)C^*_{Mq}(q,\omega_0)\right\}\cdot C_s(\omega_0)} \quad (6)$$

In the inverse phase region, i.e., in the frequency band where the angular frequency is $p^*\omega_s-\omega_0$, the plant response can be expressed by the following expression. In the expression, note that $p^*$ is an integer from 1 to $P_N$.

$$\frac{E_{md}(e^{j\cdot\omega T_S/M})}{V_{md}(e^{j\cdot\omega T_S/M})} = \quad (7)$$

$$\frac{-\frac{1}{M}P_{Mp}(p^*,\omega_0)}{1+\frac{1}{M}\left\{\overline{P_M(\omega_0)C^*_M(p,\omega_0)}\sum_{p=1}^{P_N}P_{Mp}(p,\omega_0)C^*_{Mp}(p,\omega_0)+\sum_{q=1}^{N-1}\overline{P_{Mq}(q,\omega_0)C^*_{Mq}(q,\omega_0)}\right\}\cdot\overline{C_s(\omega_0)}}$$

In the same phase region, i.e., in the frequency band where the angular frequency is $q^*\omega_s+\omega_0$, the plant response can be expressed by the following expression. In the expression, note that $q^*$ is an integer from 1 to N−1.

$$\frac{E_{md}(e^{j\cdot\omega T_S/M})}{V_{md}(e^{j\cdot\omega T_S/M})} = \quad (8)$$

$$\frac{-\frac{1}{M}P_{Mq}(p^*,\omega_0)}{1+\frac{1}{M}\left\{P_M(\omega_0)C^*_M(p,\omega_0)\sum_{p=1}^{P_N}\overline{P_{Mp}(p,\omega_0)C^*_{Mp}(p,\omega_0)}+\sum_{\substack{q=1\\q\neq q^*}}^{N-1}P_{Mq}(q,\omega_0)C^*_{Mq}(q,\omega_0)\right\}\cdot C_s(\omega_0)}$$

Note that the variables used in the right hand side of Expressions (6)-(8) are determined by the following expression. Note that the variable of $P_M$ is unknown in Expression (9a), Expression (9d), and Expression (9f), while the other variables can be measured in advance.

$$P_M(\omega)=P_M(e^{j\cdot\omega T_S/M}) \quad (9a)$$

$$C^*_M(\omega)=C^*_M(e^{j\cdot\omega T_S/M}) \quad (9b)$$

$$C_S(\omega)=C_S(j\cdot\omega T_S) \quad (9c)$$

$$P_{Mp}(p,\omega)=P_M(e^{j\cdot(p\omega S-\omega)T_S/M}) \quad (9d)$$

$$C^*_{Mp}(p,\omega)=C^*_M(e^{j\cdot(p\omega S-\omega)T_S/M}) \quad (9e)$$

$$P_{Mq}(q,\omega)=P_M(e^{j\cdot(p\omega S+\omega)T_S/M}) \quad (9f)$$

$$C^*_{Mq}(q,\omega)=C^*_M(e^{j\cdot(p\omega S+\omega)T_S/M}) \quad (9g)$$

The following two equations can be derived from Expression (6).

$$f_{VE\_0}\begin{pmatrix}P_M(\omega_0),\overline{P_{Mp}(1,\omega_0)},\ldots,\overline{P_{Mp}(P_N,\omega_0)},\\P_{Mq}(1,\omega_0),\ldots,P_{Mq}(N-1,\omega_0)\end{pmatrix}=0 \quad (10a)$$

$$f_{VE\_0}\begin{pmatrix}\overline{P_M(\omega_0)},P_{Mp}(1,\omega_0),\ldots,\\P_{Mp}(P_N,\omega_0),\overline{P_{Mq}(1,\omega_0)},\ldots,\overline{P_{Mq}(N-1,\omega_0)}\end{pmatrix}=0 \quad (10b)$$

Here, $f_{VE\_0}$ in Expression (10) is expressed by the following expression.

$$f_{VE\_0}=P_M(\omega_0)+\sum_{p=1}^{P_N}\overline{C^*_{Mp}(p,\omega_0)}\alpha_{VE}(\omega_0)C_s(\omega_0)\cdot\overline{P_{Mp}(p,\omega_0)}+ \quad (11)$$

$$\sum_{q=1}^{N-1}C^*_{Mq}(q,\omega_0)\alpha_{VE}(\omega_0)C_s(\omega_0)\cdot P_{Mq}(q,\omega_0)+M\cdot\alpha_{VE}(\omega_0)$$

Note that $\alpha_{VE}(\omega_0)$ is determined in the following expression.

$$\alpha_{VE}(\omega_0)=\frac{E_{md}(e^{j\cdot\omega_0 T_S/M})}{V_{md}(e^{j\cdot\omega_0 T_S/M})} \quad (12)$$

Here, the variables of $P_M$, $P_{Mp}$, and $P_{Mq}$ which are arguments of $f_{VE\_0}$ are unknown. $\pi_{VE}(\omega_0)$ in Expression (12) is an observable plant response. The other variables of $f_{VE\_0}$ are transfer functions that can be measured in advance. Therefore, $f_{VE\_0}$ is linear combination of unknowns. Note that the expression corresponding to Expression (6) is Expression (10a), and the complex conjugate expression of Expression (10a) is Expression (10b).

As explained above, the linear equation (10a) and the linear equation (10b) are derived from Expression (6). Likewise, the following linear equations can be obtained from Expressions (7) and (8).

From Expression (7), Expressions (13a) and (13b) are derived for each of $p^*$ (where $p^*$ is an integer from 1 to $1-P_N$).

$$f_{VE\_p^*}= \quad (13a)$$

$$f_{VE\_p^*}\begin{pmatrix}\overline{P_M(\omega_0)},P_{Mp}(1,\omega_0),\ldots,\\P_{Mp}(P_N,\omega_0),\overline{P_{Mq}(1,\omega_0)},\ldots,\overline{P_{Mq}(N-1,\omega_0)}\end{pmatrix}=0$$

$$\overline{f_{VE\_p^*}}=f_{VE\_p^*}=(P_M(\omega_0),\overline{P_{Mp}(1,\omega_0)},\ldots, \quad (13b)$$

$$\overline{P_{Mp}(P_N,\omega_0)},P_{Mq}(1,\omega_0),\ldots,P_{Mq}(N-1,\omega_0))=0$$

Here, $f_{VE\_p}^*$ is expressed by the following expression.

$$f_{VE\_p^*}=P_{Mp}(P^*,\omega_0)+\overline{P_M(\omega_0)C^*_M(\omega_0)}\alpha_{VEp}(p^*,\omega_0)\overline{C_s(\omega_0)}+ \quad (14)$$

-continued $$\sum_{p=1}^{P_N} C_{Mp}^*(p,\omega_0)\alpha_{VEp}(p^*,\omega_0)\overline{C_s(\omega_0)} \cdot P_{Mp}(p,\omega_0) +$$

$$\sum_{q=1}^{N-1} \overline{C_{Mq}^*(q,\omega_0)}\alpha_{VEp}(p^*,\omega_0)\overline{C_s(\omega_0)} \cdot \overline{P_{Mq}(q,\omega_0)} +$$

$$M \cdot \alpha_{VEp}(p^*,\omega_0)$$

$\alpha_{VEp}(p^*,\omega_0)$ in the above expression is determined in the following expression.

$$\alpha_{VEp}(P^*,\omega_0) = \frac{E_{md}(e^{j \cdot (p^*\omega_s - \omega_0)T_s/M})}{V_{md}(e^{j \cdot (p^*\omega_s - \omega_0)T_s/M})} \qquad (15)$$

The unknowns in Expressions (13a) and (13b) are the same as those of the linear equation (10a) and of the linear equation (10b).

From Equation (8), Expressions (16a) and (16b) are obtained for each of q* (where q* is an integer from 1 to N−1).

$$f_{VE\_q^*} = f_{VE\_q^*}(P_M(\omega_0), \overline{P_{Mp}(1,\omega_0)}, \ldots, \qquad (16a)$$
$$\overline{P_{Mp}(P_N,\omega_0)}, P_{Mq}(1,\omega_0), \ldots, P_{Mq}(N-1,\omega_0)) = 0$$

$$\overline{f_{VE\_q^*}} = f_{VE\_q^*}(\overline{P_M(\omega_0)}, P_{Mp}(1,\omega_0), \ldots, \qquad (16b)$$
$$P_{Mp}(P_N,\omega_0), \overline{P_{Mq}(1,\omega_0)}, \ldots, \overline{P_{Mq}(N-1,\omega_0)}) = 0$$

Here, $f_{VE\_q}^*$ is expressed in the following expression.

$$f_{VE\_q^*} = P_{Mq}(q^*,\omega_0) + P_M(\omega_0)C_M^*(\omega_0)\alpha_{VEq}(q^*,\omega_0)C_s(\omega_0) + \qquad (17)$$

$$\sum_{\substack{p=1 \\ p \neq p^*}}^{P_N} \overline{C_{Mp}^*(p,\omega_0)}\alpha_{VEQ}(q^*,\omega_0)C_s(\omega_0) \cdot \overline{P_{Mp}(p,\omega_0)} +$$

$$\sum_{q=1}^{N-1} C_{Mq}^*(q,\omega_0)\alpha_{VEq}(q^*,\omega_0)C_s(\omega_0) \cdot P_{Mq}(q,\omega_0) +$$

$$M \cdot \alpha_{VEq}(q^*,\omega_0)$$

Note that $\alpha_{VEq}(q^*,\omega_0)$ in the above expression is determined in the following expression.

$$\alpha_{VEq}(q^*,\omega_0) = \frac{E_{md}(e^{j \cdot (q^*\omega_s + \omega_0)T_s/M})}{V_{md}(e^{j \cdot (p^*\omega_s + \omega_0)T_s/M})} \qquad (18)$$

The unknowns in Expressions (16a) and (16b) are also the same as those of the linear equation (10a) and of the linear equation (10b).

As explained so far, two linear equations expressed in Expressions (10a) and (10b), $2P_N$ linear equations expressed in Expressions (13a) and (13b), and 2(N−1) linear equations expressed by Expressions (16a) and (16b) are obtained from the plant response. The matrix representation of these 2($P_N$+N) linear equations for the 2($P_N$+N) unknowns is shown below.

$$M_{VE}X_{PM}=Y_{VE} \qquad (19)$$

Here, $M_{VE}$ that is a matrix representation of 2($P_N$+N)×2($P_N$+N), $Y_{VE}$ that is a vector of 2($P_N$+N)×1, and $X_{PM}$ that is a vector of 2($P_N$+N)×1 are represented in the following expressions.

$$M_{VE} = M_{VE}(\omega_0) \in C^{2(P_N+N)\times 2(P_N+N)} \qquad (20a)$$

$$Y_{VE} = Y_{VE}(\omega_0) \in C^{2(P_N\times M)\times 1} \qquad (20b)$$

$$X_{PM} = [P_M(\omega_0), P_{Mp}(1,\omega_0), \ldots, \qquad (20c)$$
$$P_{Mp}(P_N,\omega_0), P_{Mq}(1,\omega_0), \ldots, P_{Mq}(N-1,\omega_0),$$
$$\overline{P_M(\omega_0)}, \overline{P_{Mp}(1,\omega_0)}, \ldots, \overline{P_{Mp}(P_N,\omega_0)}, \overline{P_{Mq}(1,\omega_0)}, \ldots,$$
$$(\overline{P_{Mq}(N-1,\omega_0)})]^T \in C^{2(P_N+M)\times 1}$$

Therefore, the vector XPM to be obtained can be calculated as follows.

$$X_{PM}=M_{VE}^{-1}Y_{VE} \qquad (21)$$

Accordingly, PM in one or more frequencies above the Nyquist frequency (i.e. pωs−ω0, qωs+ω0) can be calculated by measuring the plant response while a disturbance signal folded to the frequency corresponding to ω0 is added to a manipulated variable signal. Performing the same analysis by changing the frequency of the disturbance signal yields PM in different frequencies. In measuring the plant response, the response detection section 230 detects a disturbance added signal and an error signal as input/output signals, thereby detecting the input/output response of the controlled object in the aliasing frequency based on the input/output signals.

Figure 5:
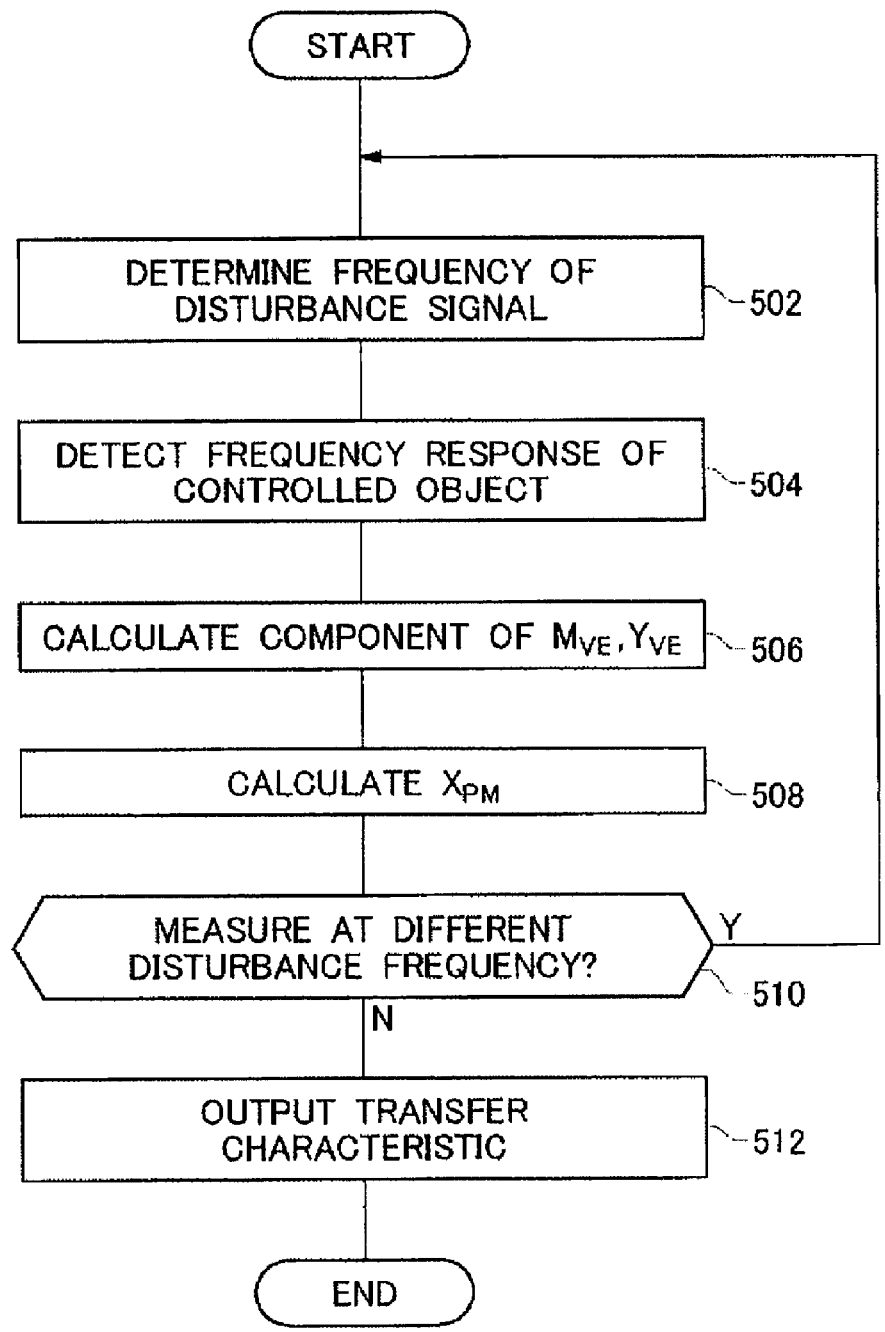
FIG. 5 shows an example of a calculation flow of $P_M(z)$ in the disk apparatus.

FIG. 5 shows an example of the calculation flow of PM (z) of the disk apparatus 10. The disturbance signal generating section 210 determines the frequency of a disturbance signal added to a manipulated variable signal (Step 502). The response detection section 230 detects the frequency response of the controlled object (Step 504). With the means for measuring the above-described plant response, the response detection section 230 detects the above-described αVE, αVEp, and αVEq.

The transfer characteristic calculating section 240 calculates each component of MVE and each component of YVE (Step 506). The transfer characteristic calculating section 240 calculates each component of XPM, and retains the calculated components of the XPM (Step 508).

The disturbance signal generating section 210 determines whether to perform measurement with a disturbance signal of a different frequency. For example, the disturbance signal generating section 210 determines not to perform measurement with a disturbance signal of a different frequency if $X_{PM}$ has already been calculated for all the plurality of disturbance frequencies predetermined as measurement targets. On the contrary, the disturbance signal generating section 210 determines to perform measurement at a different frequency, if any of the predetermined plurality of disturbance frequencies has uncalculated $X_{PM}$ components.

When it is determined to perform measurement at a different frequency in Step 510, the disturbance frequency is determined by returning the control to Step 502, and $X_{PM}$ is calculated in Step 508, via Step 504 and Step 506. When it is determined not to perform measurement at a different frequency in Step 510, the output section 260 outputs the transfer characteristic represented by the component of $X_{PM}$ retained by the transfer characteristic calculating section 240 to outside (Step 512).

In Step 512, the output section 260 may output a signal representing the transfer characteristic to outside of the disk apparatus 10. The output section 260 may also output a signal calculated according to the transfer characteristic, to outside of the disk apparatus 10. Examples of the signal calculated according to the transfer characteristic may include a signal representing whether the head positioning mechanism including the head assembly 18 is acceptable or not, and an unacceptability signal representing unacceptability of the head positioning mechanism.

The transfer characteristic calculating section 240 may determine the magnitude of the mechanical resonance using the calculated transfer characteristic, for example. The output section 260 may output an unacceptability signal on condition that the magnitude of the mechanical resonance is larger than a predetermined value. To be more specific, the transfer characteristic calculating section 240 determines, based on the calculated transfer characteristic, whether the head positioning mechanism has a resonance characteristic where an aliasing component larger than a predetermined value appears in the vicinity of a DC band. The output section 260 may output an unacceptability signal on condition that the head positioning mechanism has the resonance characteristic.

Note that "outside of the disk apparatus 10" may be a host computer. The output section 260 may also output the signal representing the transfer characteristic or the signal calculated according to the transfer characteristic to a device within the disk apparatus 10.

Note that, in Step 510, the transfer characteristic calculating section 240 may determine whether the magnitude of the mechanical resonance is larger than the predetermined value, using the transfer characteristic in the calculated specific frequency. When the magnitude of the mechanical resonance is determined to be larger than the predetermined value, the control is moved to Step 512 without performing measurement with the different disturbance frequency, and the aforementioned unacceptability signal may be outputted in Step 512. Examples of the specific frequency may include a frequency of a band appearing as an aliasing component in the vicinity of the DC band.

As described above, the disk apparatus 10 of the present embodiment is able to accurately calculate the original transfer characteristic $P_M$ in one or more frequencies exceeding the Nyquist frequency. For example, a method of detecting oscillation of the head assembly 18 with the laser interferometry cannot be used while the disk apparatus 10 is in an assembled state. However, the analysis method of the present embodiment is able to examine the head assembly 18 while the disk apparatus 10 is in an assembled state. Moreover, when the method of detecting oscillation using the laser interferometry is applied to the head assembly 18 with a plurality of heads 20, oscillation of a part of the head assembly 18 shielded by the disk 12 cannot be accurately evaluated. However, the analysis method of the present embodiment may be able to accurately evaluate the oscillation characteristic of the head assembly 18 with a plurality of heads 20.

In addition, the process flow described above can be incorporated into the disk apparatus 10. According to the analysis method of the present embodiment, existence of the mechanical resonance can be evaluated and the magnitude of the mechanical resonance can be evaluated while the disk apparatus 10 is in a built up state. Therefore, when the head assembly 18 is evaluated to have a mechanical resonance larger than a predetermined value, shipping of the disk apparatus 10 can be stopped. In this sense, the analysis method of the present embodiment can be used in the manufacturing of the disk apparatus 10.

Moreover, the analysis method of the present embodiment enables examination of the disk apparatus 10 while the disk apparatus 10 is in actual operation at the user side. When it is determined that there is a mechanical resonance larger than a predetermined value, the host computer, which writes and reads data using the disk apparatus 10, can be informed of the fact, thereby enabling the user to be aware of the fact.

As mentioned above, $P_M$ can also be calculated by measuring the open loop characteristic, the sensitivity function, the closed loop characteristic, or the settling function. The following describes the analysis method for calculating $P_M$ by measuring the open loop characteristic, the sensitivity function, the closed loop characteristic, and the settling function in the stated order, in relation to the expressions used to explain the analysis using the plant characteristic.

The method of measuring the open loop characteristic measures an input/output response of the system that has $V_{md}$ as an input and $U_{md}$ as an output. In relation to Expression (6), the input/output response of the angular frequency smaller than $\omega_N$ is expressed as follows.

$$\frac{U_{md}(e^{j\omega T_s/M})}{V_{md}(e^{j\omega T_s/M})} = \frac{-\frac{1}{M}P_M(\omega_0)C_s(\omega_0)C_M^*(\omega_0)}{1+\frac{1}{M}\left\{\sum_{p=1}^{P_N}\overline{P_{Mp}(p,\omega_0)C_{Mp}^*(p,\omega_0)} + \sum_{q=1}^{N-1}P_{Mq}(q,\omega_0)C_{Mq}^*(q,\omega_0)\right\}\cdot C_s(\omega_0)} \quad (22)$$

From the above expression, the following expression is obtained as a linear equation corresponding to Expression (10). The unknowns of this linear equation are the same as the unknowns of Expression (10), and so representation of the arguments is omitted here. The same applies to any linear equations in the inverse phase region and the same phase region described later, and their arguments are not shown either.

$$f_{VU\_0} = 0 \quad (23a)$$

$$\overline{f_{VU\_0}} = 0 \quad (23b)$$

In relation to Expression (7), the input/output response in the inverse phase region is expressed by the following expression.

$$\frac{U_{md}(e^{j\omega T_s/M})}{V_{md}(e^{j\omega T_s/M})} = \quad (24)$$

$$\frac{-\frac{1}{M}P_{Mp}(p^*,\omega_0)\overline{C_s(\omega_0)}C_{Mp}^*(p^*,\omega_0)}{1+\frac{1}{M}\left\{\overline{P_M(\omega_0)C_M^*(\omega_0)} + \sum_{\substack{p=1\\p\neq p^*}}^{P_N}P_{Mp}(p,\omega_0)C_{Mp}^*(p,\omega_0) + \sum_{q=1}^{N-1}\overline{P_{Mq}(q,\omega_0)C_{Mq}^*(q,\omega_0)}\right\}\cdot \overline{C_s(\omega_0)}}$$

From the above expression, the following expression is obtained as the linear equations corresponding to Expression (13).

$$f_{VU\_p^*} = 0 \quad (25a)$$

$$\overline{f_{VU\_p^*}} = 0 \tag{25b}$$

In relation to Expression (8), the input/output response in the same phase region is expressed by the following expression.

$$\frac{U_{md}(e^{j\omega T_s/M})}{V_{md}(e^{j\omega T_s/M})} = \tag{26}$$

$$\frac{-\frac{1}{M}P_{Mq}(p^*,\omega_0)C_s(\omega_0)C^*_{Mq}(q^*,\omega_0)}{1+\frac{1}{M}\left\{P_M(\omega_0)C^*_M(\omega_0)+\sum_{p=1}^{P_N}\overline{P_{Mp}(p,\omega_0)C^*_{Mp}(p,\omega_0)}+\sum_{\substack{q=1\\q\neq q^*}}^{N-1}P_{Mq}(q,\omega_0)C^*_{Mq}(q,\omega_0)\right\}\cdot C_s(\omega_0)}$$

From the above expression, the following expression is obtained as the linear equations corresponding to Expression (16).

$$f_{VU\_q^*}=0 \tag{27a}$$

$$\overline{f_{VU\_q^*}} = 0 \tag{27b}$$

The following expression that corresponds to Expression (19) is obtained, by representing the linear equations of Expressions (23a), (23b), (25a), (25b), (27a), and (27b) in a matrix.

$$M_{VU}X_{P_M}=Y_{VU} \tag{28}$$

Hence, the vector $X_{PM}$ to be obtained can be calculated as follows.

$$X_{PM}=M_{VU}^{-1}Y_{VU} \tag{29}$$

In this way, $P_M$ can also be calculated by measuring the open loop characteristic. The present method can also be applied to the process flow explained in relation to FIG. 5. Specifically, the step of detecting the input/output response for the open loop characteristic can be executed as the step corresponding to Step 504, and the step of calculating each component of $M_{VU}$ and each component of $Y_{VU}$ can be executed as the step corresponding to Step 506. The similar process may be performed in the other steps to calculate $P_M$. In measuring the open loop characteristic, the response detection section 230 detects the disturbance added signal and the manipulated variable signal as input/output signals, thereby detecting the open loop characteristic in an aliasing frequency based on the input/output signals.

Next, the method of measuring the sensitivity function measures the input/output response of the system that has $W_{md}$ as an input and $V_{md}$ as an output. In relation to Expression (6), the input/output response of the angular frequency smaller than $\omega_N$ is expressed as follows.

$$\frac{V_{md}(e^{j\omega T_s/M})}{W_{md}(e^{j\omega T_s/M})} = \tag{30}$$

$$\frac{1+\frac{1}{M}\left\{\sum_{p=1}^{P_N}\overline{P_{Mp}(p,\omega_0)C^*_{Mp}(p,\omega_0)}+\sum_{q=1}^{N-1}P_{Mq}(q,\omega_0)C^*_{Mq}(q,\omega_0)\right\}\cdot C_s(\omega_0)}{1+\frac{1}{M}\left\{P_M(\omega_0)C^*_M(\omega_0)+\sum_{p=1}^{P_N}\overline{P_{Mp}(p,\omega_0)C^*_{Mp}(p,\omega_0)}+\sum_{q=1}^{N-1}P_{Mq}(q,\omega_0)C^*_{Mq}(q,\omega_0)\right\}\cdot C_s(\omega_0)}$$

From the above expression, the following expressions are obtained as linear equations corresponding to Expression (10).

$$f_{WV\_0}=0 \tag{31a}$$

$$\overline{f_{WV\_0}} = 0 \tag{31b}$$

In relation to Expression (7), the input/output response in the inverse phase region is expressed by the following expression.

$$\frac{V_{md}(e^{j\omega T_s/M})}{W_{md}(e^{j\omega T_s/M})} = \tag{32}$$

$$\frac{1+\frac{1}{M}\left\{\overline{P_M(\omega_0)C^*_M(\omega_0)}+\sum_{\substack{p=1\\p\neq p^*}}^{P_N}P_{Mp}(p,\omega_0)C^*_{Mp}(p,\omega_0)+\sum_{q=1}^{N-1}\overline{P_{Mq}(q,\omega_0)C^*_{Mq}(q,\omega_0)}\right\}\cdot\overline{C_s(\omega_0)}}{1+\frac{1}{M}\left\{\overline{P_M(\omega_0)C^*_M(\omega_0)}+\sum_{p=1}^{P_N}P_{Mp}(p,\omega_0)C^*_{Mp}(p,\omega_0)+\sum_{q=1}^{N-1}\overline{P_{Mq}(q,\omega_0)C^*_{Mq}(q,\omega_0)}\right\}\cdot\overline{C_s(\omega_0)}}$$

From the above expression, the following expressions are obtained as the linear equations corresponding to Expression (13).

$$f_{WV\_p^*}=0 \tag{33a}$$

$$\overline{f_{WV\_p^*}} = 0 \tag{33b}$$

In relation to Expression (8), the input/output response in the same phase region is expressed by the following expression.

$$\frac{V_{md}(e^{j\cdot\omega T_s/M})}{W_{md}(e^{j\cdot\omega T_s/M})} = \qquad (34)$$

$$\frac{\left\{\sum_{\substack{q=1\\q\neq q^*}}^{N-1} P_{Mq}(q,\omega_0)C^*_{Mq}(q,\omega_0)\right\} \cdot C_s(\omega_0)}{1 + \frac{1}{M}\left\{P_M(\omega_0)C^*_M(\omega_0) + \sum_{p=1}^{P_N} \overline{P_{Mp}(p,\omega_0)C^*_{Mp}(p,\omega_0)} + \sum_{q=1}^{N-1} P_{Mq}(q,\omega_0)C^*_{Mq}(q,\omega_0)\right\} \cdot C_s(\omega_0)}$$

From the above expression, the following expressions are obtained as the linear equations corresponding to Expression (16).

$$f_{VU\_q^*}=0 \qquad (35a)$$

$$\overline{f_{VU\_q^*}} = 0 \qquad (35b)$$

The following expression that corresponds to Expression (19) is obtained, by representing the linear equations of Expressions (31a), (31b), (33a), (33b), (35a), and (35b) in a matrix.

$$M_{WV}X_{PM}=Y_{WV} \qquad (36)$$

Hence, the vector $X_{PM}$ to be obtained can be calculated as follows.

$$X_{PM}=M_{WV}^{-1}Y_{WV} \qquad (37)$$

In this way, $P_M$ can also be calculated by measuring the sensitivity function. The present method can also be applied to the process flow explained in relation to FIG. 5. Specifically, the step of detecting the input/output response for the sensitivity function can be executed as the step corresponding to Step 504, and the step of calculating each component of $M_{WV}$ and each component of $Y_{WV}$ can be executed as the step corresponding to Step 506. The similar process may be performed in the other steps to calculate $P_M$. In measuring the sensitivity function, the response detection section 230 detects the disturbance signal and the disturbance added signal as input/output signals, thereby detecting the sensitivity characteristic in an aliasing frequency based on the input/output signals.

The method of measuring the closed loop characteristic measures the input/output response of the system that has $W_{md}$ as an input and $V_{md}$ as an output. In relation to Expression (6), the input/output response of the angular frequency smaller than $\omega_N$ is expressed as follows.

$$\frac{U_{md}(e^{j\cdot\omega T_s/M})}{W_{md}(e^{j\cdot\omega T_s/M})} = \qquad (38)$$

$$\frac{-\frac{1}{M}P_M(\omega_0)C_s(\omega_0)C^*_M(\omega_0)}{1 + \frac{1}{M}\left\{P_M(\omega_0)C^*_M(\omega_0) + \sum_{p=1}^{P_N} \overline{P_{Mp}(p,\omega_0)C^*_{Mp}(p,\omega_0)} + \sum_{q=1}^{N-1} P_{Mq}(q,\omega_0)C^*_{Mq}(q,\omega_0)\right\} \cdot C_s(\omega_0)}$$

From the above expression, the following expressions are obtained as linear equations corresponding to Expression (10).

$$f_{WV\_0}=0 \qquad (39a)$$

$$\overline{f_{WU\_0}} = 0 \qquad (39b)$$

In relation to Expression (7), the input/output response in the inverse phase region is expressed by the following expression.

$$\frac{U_{md}(e^{j\cdot\omega T_s/M})}{W_{md}(e^{j\cdot\omega T_s/M})} = \qquad (40)$$

$$\frac{-\frac{1}{M}P_{Mp}(p^*,\omega_0)\overline{C_s(\omega_0)}C^*_{Mp}(p^*,\omega_0)}{1 + \frac{1}{M}\left\{\overline{P_M(\omega_0)C^*_M(\omega_0)} + \sum_{p=1}^{P_N} P_{Mp}(p,\omega_0)C^*_{Mp}(p,\omega_0) + \sum_{q=1}^{N-1} \overline{P_{Mq}(q,\omega_0)C^*_{Mq}(q,\omega_0)}\right\} \cdot \overline{C_s(\omega_0)}}$$

From the above expression, the following expressions are obtained as the linear equations corresponding to Expression (13).

$$f_{WV\_p^*}=0 \qquad (41a)$$

$$\overline{f_{WU\_p^*}} = 0 \qquad (41b)$$

In relation to Expression (8), the input/output response in the same phase region is expressed by the following expression.

$$\frac{U_{md}(e^{j\cdot\omega T_s/M})}{W_{md}(e^{j\cdot\omega T_s/M})} = \qquad (42)$$

$$\frac{-\frac{1}{M}P_{Mq}(q^*,\omega_0)C_s(\omega_0)C^*_{Mq}(q,\omega_0)}{1 + \frac{1}{M}\left\{P_M(\omega_0)C^*_M(\omega_0) + \sum_{p=1}^{P_N} \overline{P_{Mp}(p,\omega_0)C^*_{Mp}(p,\omega_0)} + \sum_{q=1}^{N-1} P_{Mq}(q,\omega_0)C^*_{Mq}(q,\omega_0)\right\} \cdot C_s(\omega_0)}$$

From the above expression, the following expressions are obtained as the linear equations corresponding to Expression (16).

$f_{WV\_q^*} = 0$ (43a)

$\overline{f_{WU\_q^*}} = 0$ (43b)

The following expression that corresponds to Expression (19) is obtained, by representing the linear equations of Expressions (39a), (39b), (41a), (41b), (43a), and (43b) in a matrix.

$M_{WU} X_{P_M} = Y_{WU}$ (44)

Hence, the vector $X_{PM}$ to be obtained can be calculated as follows.

$X_{P_M} = M_{WU}^{-1} Y_{WU}$ (45)

In this way, $P_M$ can also be calculated by measuring the closed loop characteristic. The present method can also be applied to the process flow explained in relation to FIG. 5. Specifically, the step of detecting the input/output response for the closed loop characteristic can be executed as the step corresponding to Step 504, and the step of calculating each component of $M_{WU}$ and each component of $Y_{WU}$ can be executed as the step corresponding to Step 506. The similar process may be performed in the other steps to calculate $P_M$. In measuring the closed loop characteristic, the response detection section 230 detects the disturbance signal and the manipulated variable signal as input/output signals, thereby detecting the closed loop characteristic in an aliasing frequency based on the input/output signals.

The method of measuring the settling function measures the input/output response of the system that has $W_{md}$ as an input and $E_{md}$ as an output. In relation to Expression (6), the input/output response of the angular frequency smaller than $\omega_N$ is expressed as follows.

$$\frac{E_{md}(e^{j\omega T_s/M})}{W_{md}(e^{j\omega T_s/M})} = \quad (46)$$

$$\frac{-\frac{1}{M} P_M(\omega_0)}{1 + \frac{1}{M}\left\{ P_M(\omega_0)C_M^*(\omega_0) + \sum_{p=1}^{P_N} \overline{P_{Mp}(p,\omega_0)C_{Mp}^*(p,\omega_0)} + \sum_{q=1}^{N-1} P_{Mq}(q,\omega_0)C_{Mq}^*(q,\omega_0) \right\} \cdot C_s(\omega_0)}$$

From the above expression, the following expressions are obtained as linear equations corresponding to Expression (10).

$f_{WV\_0} = 0$ (47a)

$\overline{f_{WE\_0}} = 0$ (47b)

In relation to Expression (7), the input/output response in the inverse phase region is expressed by the following expression.

$$\frac{E_{md}(e^{j\omega T_s/M})}{W_{md}(e^{j\omega T_s/M})} = \quad (48)$$

-continued $$\frac{-\frac{1}{M} P_M(p^*, \omega_0)}{1 + \frac{1}{M}\left\{ \overline{P_M(\omega_0)C_M^*(\omega_0)} + \sum_{p=1}^{P_N} P_{Mp}(p,\omega_0)C_{Mp}^*(p,\omega_0) + \sum_{q=1}^{N-1} \overline{P_{Mq}(q,\omega_0)C_{Mq}^*(q,\omega_0)} \right\} \cdot C_s(\omega_0)}$$

From the above expression, the following expressions are obtained as the linear equations corresponding to Expression (13).

$f_{WV\_p^*} = 0$ (49a)

$\overline{f_{WE\_p^*}} = 0$ (49b)

In relation to Expression (8), the input/output response in the same phase region is expressed by the following expression.

$$\frac{E_{md}(e^{j\omega T_s/M})}{W_{md}(e^{j\omega T_s/M})} = \quad (50)$$

$$\frac{-\frac{1}{M} P_{Mq}(q^*, \omega_0)}{1 + \frac{1}{M}\left\{ P_M(\omega_0)C_M^*(\omega_0) + \sum_{p=1}^{P_N} \overline{P_{Mp}(p,\omega_0)C_{Mp}^*(p,\omega_0)} + \sum_{q=1}^{N-1} P_{Mq}(q,\omega_0)C_{Mq}^*(q,\omega_0) \right\} \cdot C_s(\omega_0)}$$

From the above expression, the following expressions are obtained as the linear equations corresponding to Expression (16).

$f_{WE\_q^*} = 0$ (51a)

$\overline{f_{WE\_q^*}} = 0$ (51b)

The following expression that corresponds to Expression (19) is obtained, by representing the linear equations of Expressions (47a), (47b), (49a), (49b), (51a), and (51b) in a matrix.

$M_{WE} X_{P_M} = Y_{WE}$ (52)

Hence, the vector $X_{PM}$ to be obtained can be calculated as follows.

$X_{P_M} = M_{WE}^{-1} Y_{WE}$ (53)

In this way, $P_M$ can also be calculated by measuring the settling function. The present method can also be applied to the process flow explained in relation to FIG. 5. Specifically, the step of detecting the input/output response for the settling function can be executed as the step corresponding to Step 504, and the step of calculating each component of $M_{WE}$ and each component of $Y_{WE}$ can be executed as the step corresponding to Step 506. The similar process may be performed in the other steps to calculate $P_M$. In measuring the settling function, the response detection section 230 detects the disturbance signal and the error signal as input/output signals, thereby detecting the settling characteristic in an aliasing frequency based on the input/output signals.

The analysis method of the present embodiment can calculate $P_M$ by solving the linear equations. Therefore, $P_M$ can be calculated by a relatively small operational amount, which makes it easy to implement the present analysis method to a device.

Figure 6:
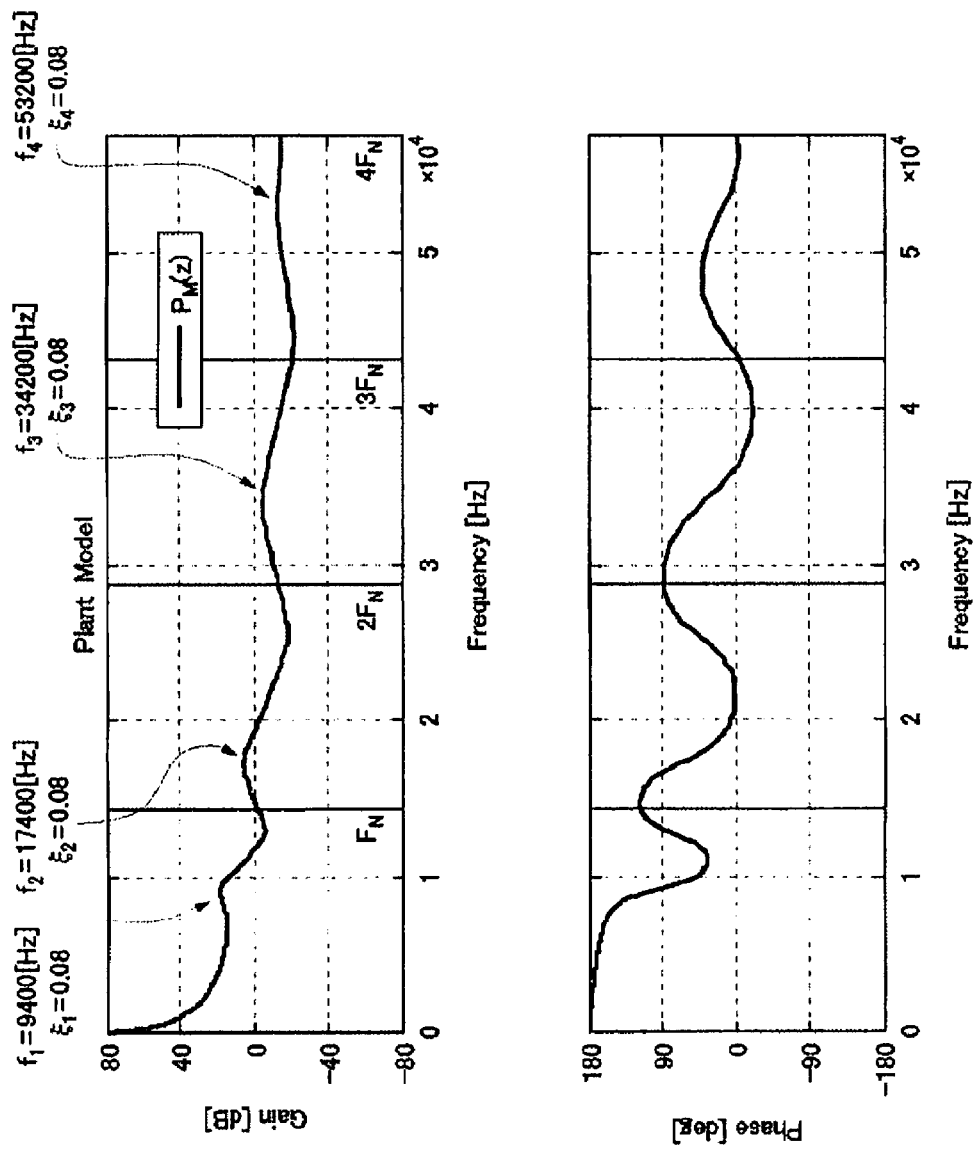
FIG. 6 shows a virtual plant model corresponding to $P_M(z)$.

FIGS. 6-15 show examples of simulation results obtained by applying the analysis method explained as the present embodiment to a virtual control system. FIG. 6 shows a virtual plant model corresponding to $P_M(z)$. Here, the plant model is represented as a product between a transfer function $G_{mech}$ representing the resonance characteristic, a transfer function $G_{amp}$ mainly corresponding to the power amplifier 34, and a transfer function $G_{dly}$ of the time delay element.

Here, $G_{mech}$ has a fourth-order oscillation mode. $G_{mech}$ has four oscillation modes in the frequencies of $f_1$=9,400 Hz, $f_2$=17,400 Hz, $f_3$=34,200 Hz, and $f_4$=53,200 Hz. Each oscillation mode is assumed to have a coefficient $\xi$=0.08. $F_N$(=14,400 Hz) represents a Nyquist frequency, and mechanical resonance exists in a frequency band higher than $F_N$. The time delay amount of the time delay element $G_s(S)$ is 0s, and $G_{amp}(s)$ is 0.73 A/V.

The multi-rate control is performed at a multi-rate number M=4. Therefore, the frequency response in the frequency band up to $4F_N$ is set as the target of analysis and evaluation.

Figure 7:
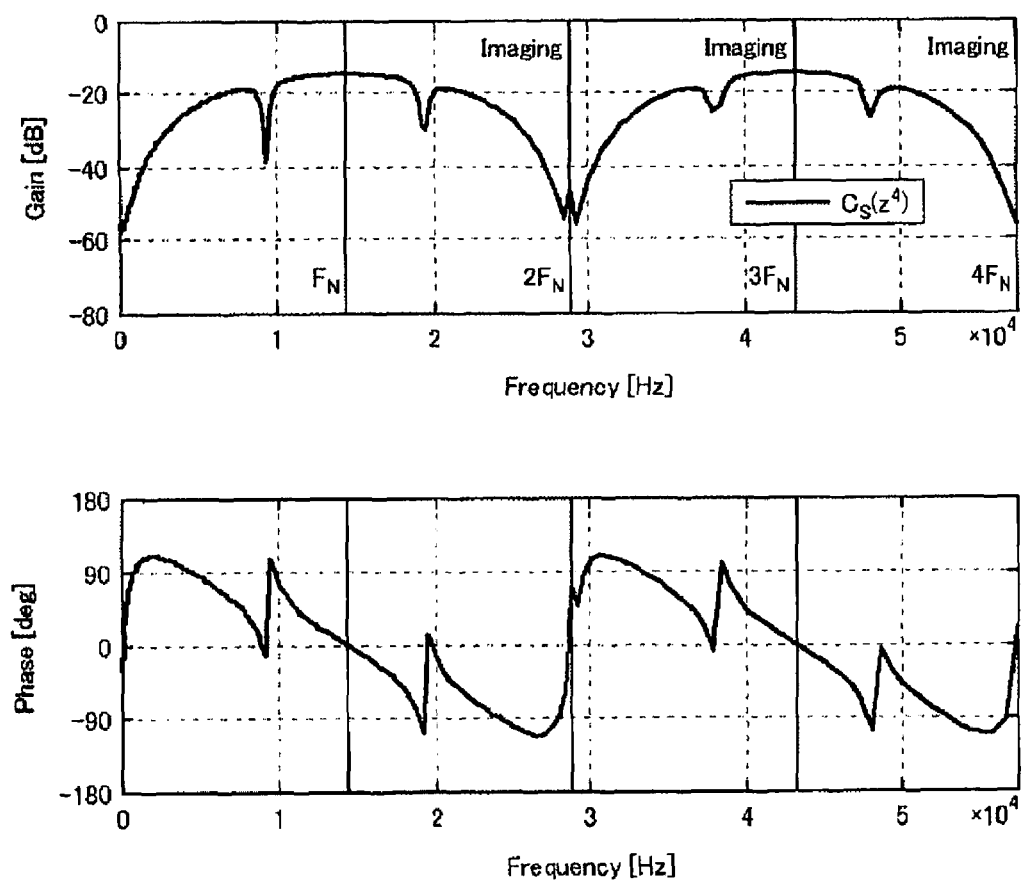
FIG. 7 shows a transfer function $C_S$ of a virtual controller part of a single rate.

FIG. 7 shows a transfer function $C_S$ of a virtual controller part of a single rate. The present controller has a prewarped notch characteristic in the frequency of 9,400 Hz. In addition, the controller has such a transfer characteristic of having a pole in 0 Hz, 7,000 Hz, and 8,000 Hz, and zero in 200 Hz and 1,000 Hz. The response component of $C_S$ exceeding $F_N$ is an imaging component.

Figure 8:
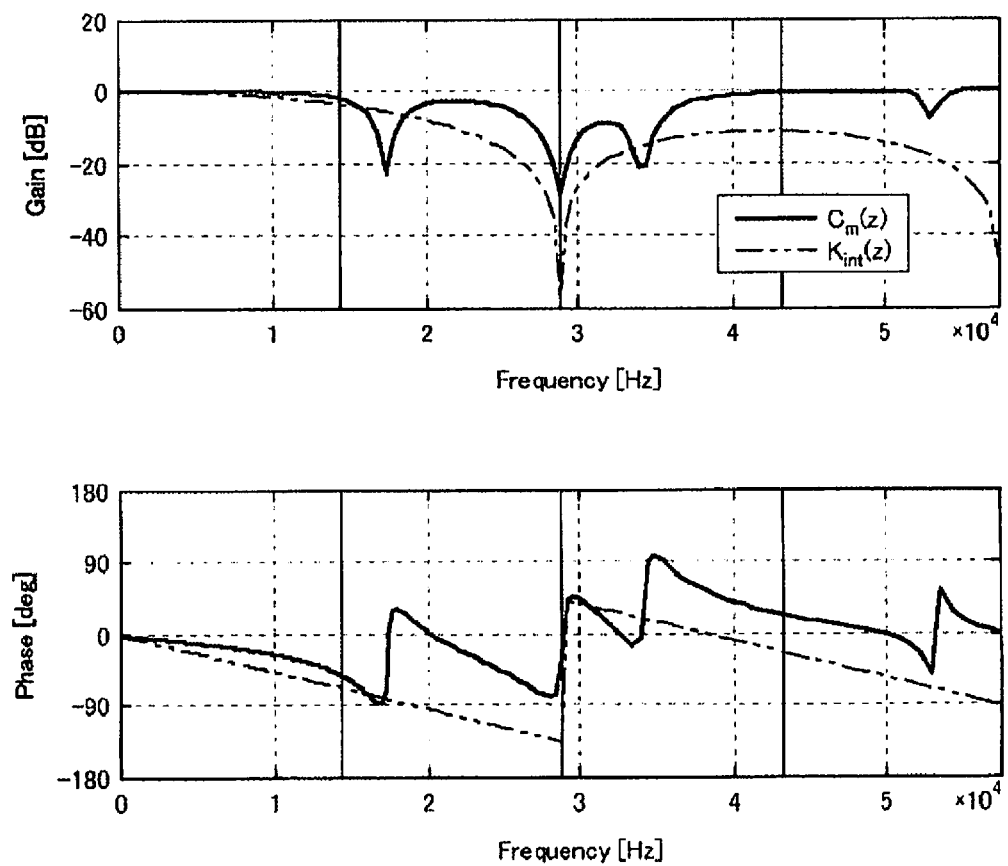
FIG. 8 shows a transfer characteristic of a controller part of a multi-rate frequency domain.

FIG. 8 shows a transfer characteristic of a controller part of a multi-rate frequency domain. A multi-rate frequency signal is assumed to have been obtained by $0^{th}$-order hold interpolation. Here, the controller has a prewarped notch filter in the frequency of 17,400 Hz, 28,800 Hz, 34,200 Hz, and 53,200 Hz.

Figure 9:
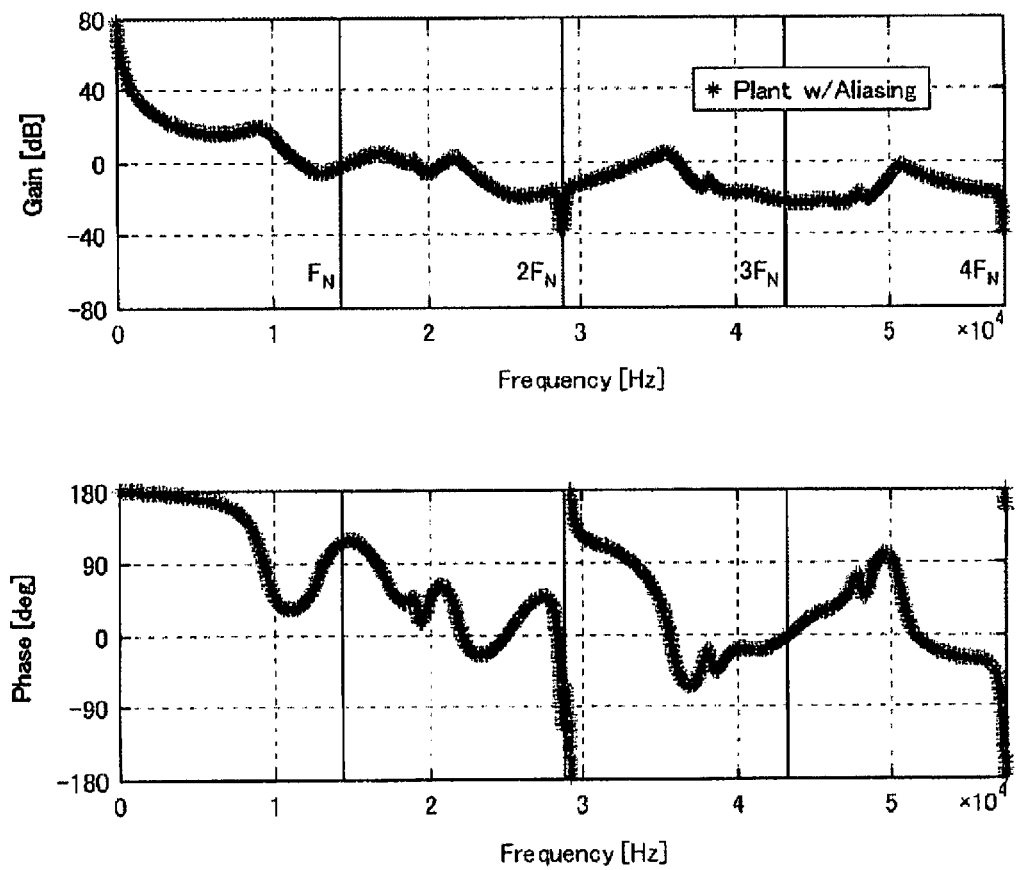
FIG. 9 shows a plant response observable by a virtual control system.

FIG. 9 shows a plant response observable by a virtual control system. The measured plant response contains an aliasing component that appears by sampling at the frequency of $2F_N$.

Figure 10:
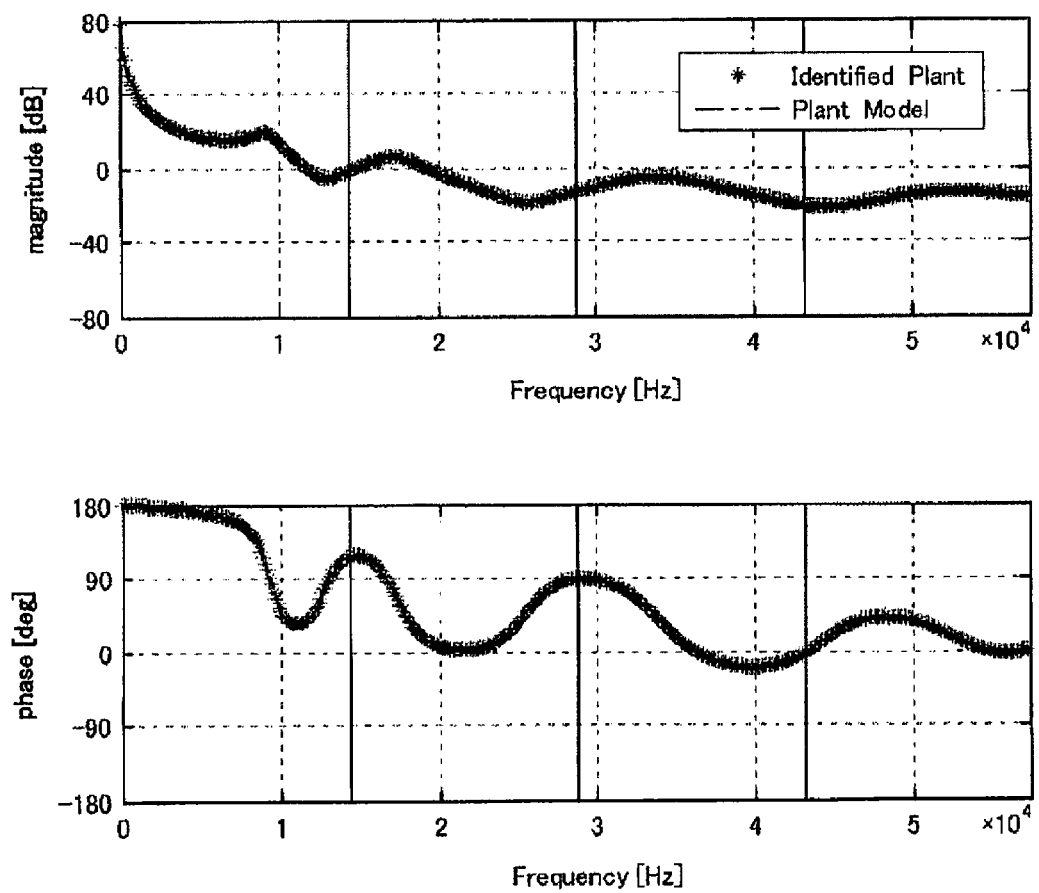
FIG. 10 shows a transfer characteristic of $P_M(z)$ calculated by measurement of the plant response.

FIG. 10 shows a transfer function of $P_M(z)$ calculated by measurement of the plant response. The response value calculated at each $\omega_0$ is plotted in a rhombus, together with the plant model of FIG. 6. FIG. 10 shows a transfer characteristic favorably matching the assumed plant model.

Figure 11:
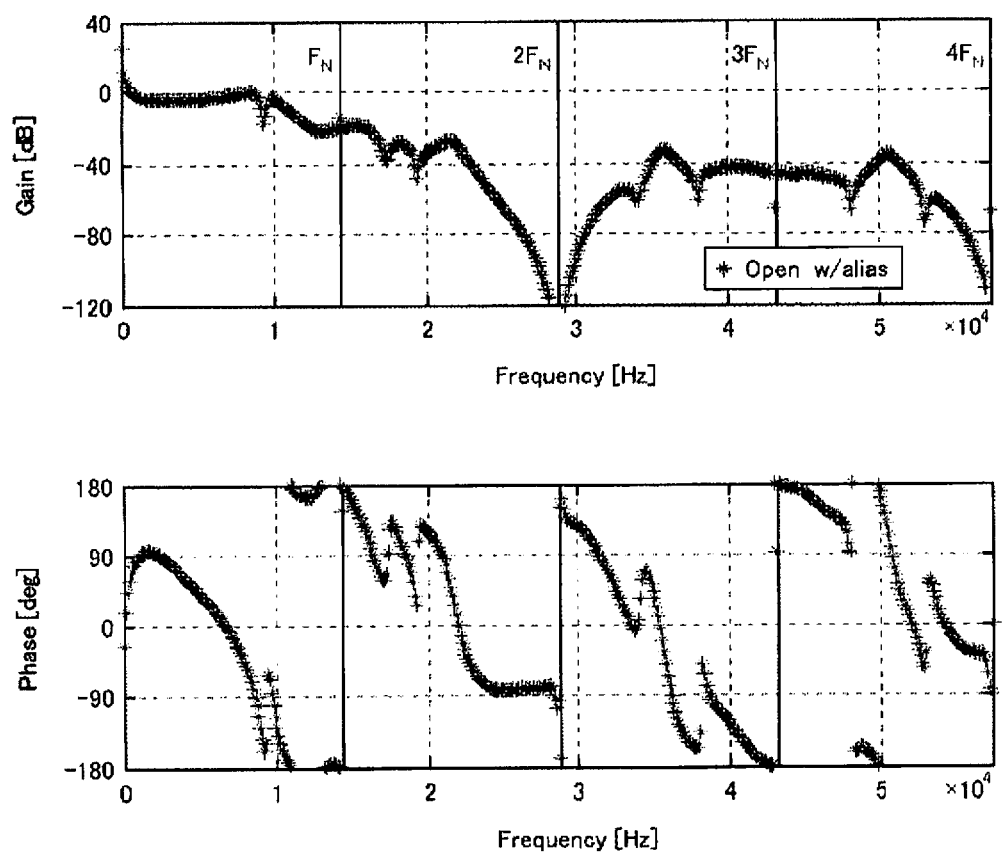
FIG. 11 shows an open loop characteristic observable by the virtual control system.

FIG. 11 shows an open loop characteristic observable by the virtual control system. The measured open loop characteristic contains an aliasing component that appears by sampling at the frequency of $2F_N$.

Figure 12:
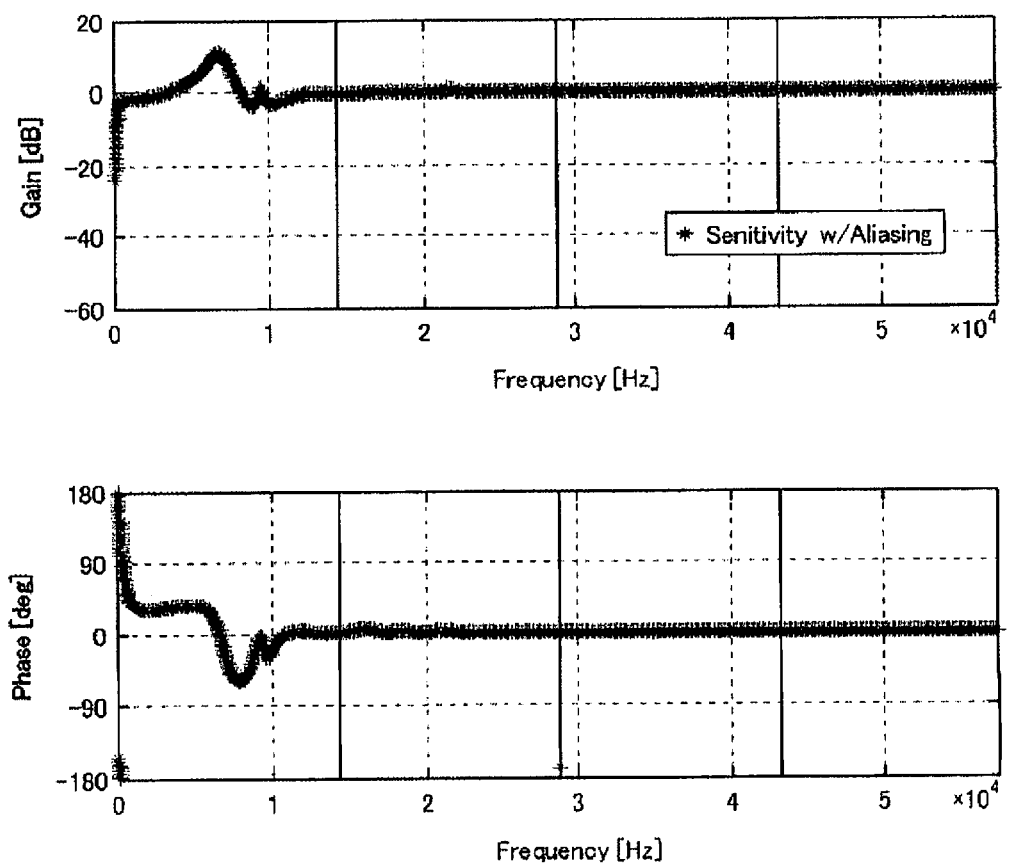
FIG. 12 shows a sensitivity function observable by the virtual control system.

FIG. 12 shows a sensitivity function observable by the virtual control system. The measured sensitivity function contains an aliasing component that appears by sampling at the frequency of $2F_N$.

Figure 13:
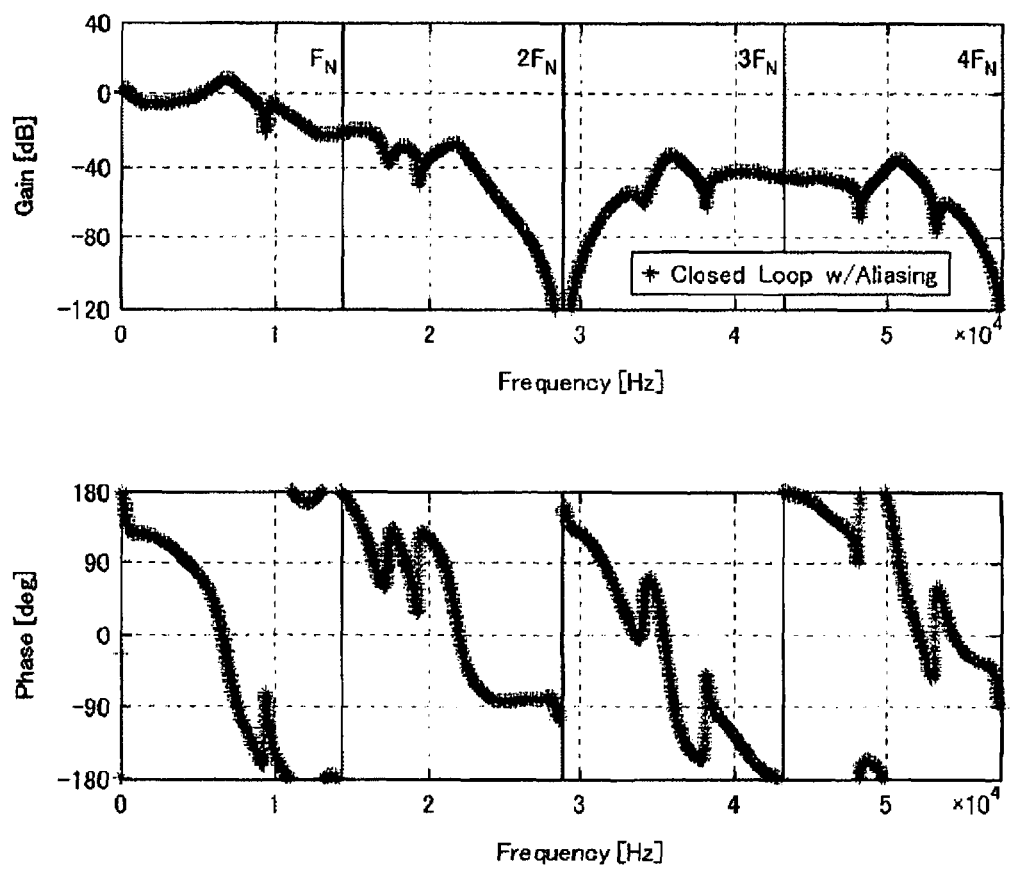
FIG. 13 shows a closed loop characteristic observable by the virtual control system.

FIG. 13 shows a closed loop characteristic observable by the virtual control system. The measured closed loop characteristic contains an aliasing component that appears by sampling at the frequency of $2F_N$.

Figure 14:
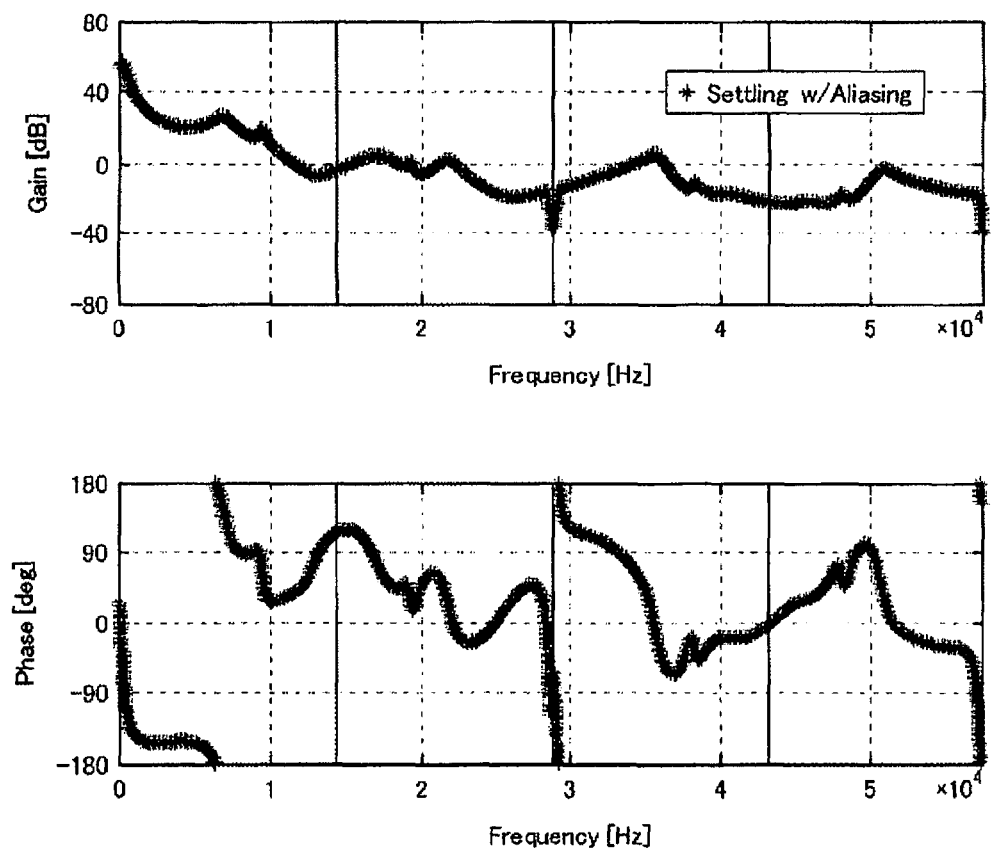
FIG. 14 shows a settling function observable by the virtual control system.

FIG. 14 shows a settling function observable by the virtual control system. The measured settling function contains an aliasing component that appears by sampling at the frequency of $2F_N$.

Figure 15:
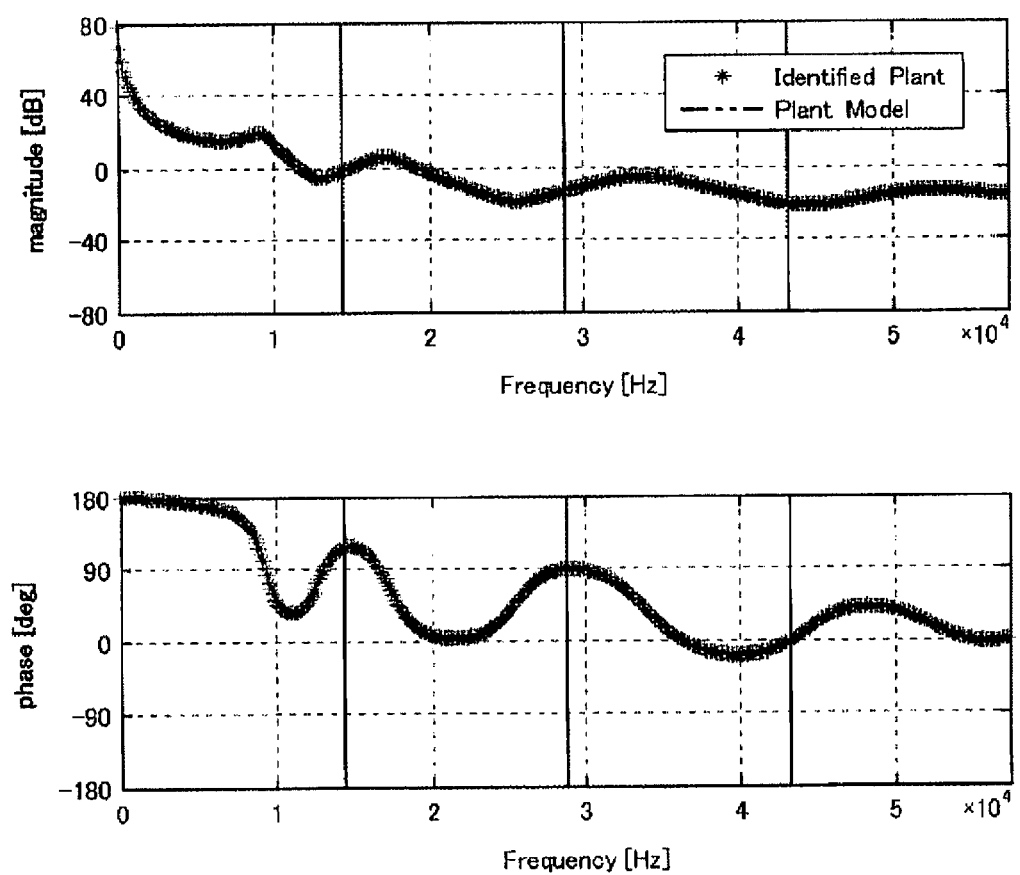
FIG. 15 shows $P_M(z)$ calculated by measurement of a feedback loop characteristic other than a plant response.

FIG. 15 shows $P_M(z)$ calculated by measuring the feedback loop characteristic other than the plant response explained in relation to FIGS. 11-14. Usage of the feedback loop characteristic of any of the open loop characteristic, the sensitivity function, the closed loop characteristic, and the settling function has resulted in the transfer characteristic favorably matching the assumed plant model.

Figure 16:
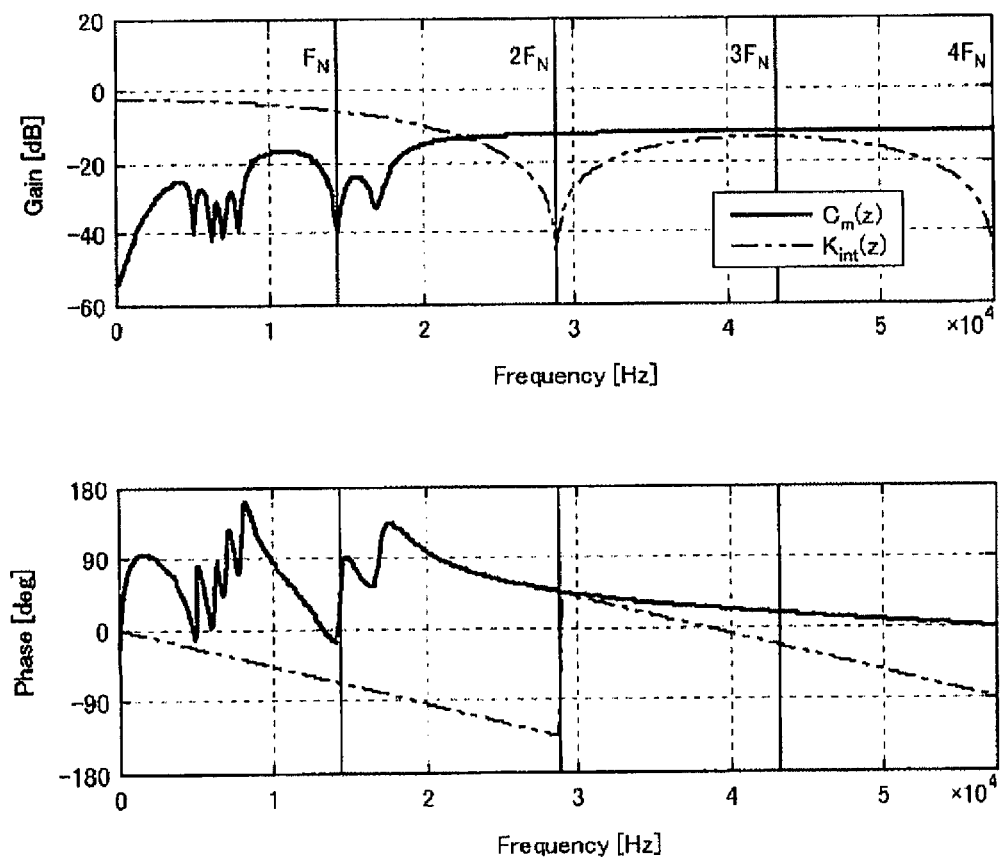
FIG. 16 shows a transfer characteristic of a multi-rate controller part measured in a hard disk apparatus used in an experiment.
Figure 17:
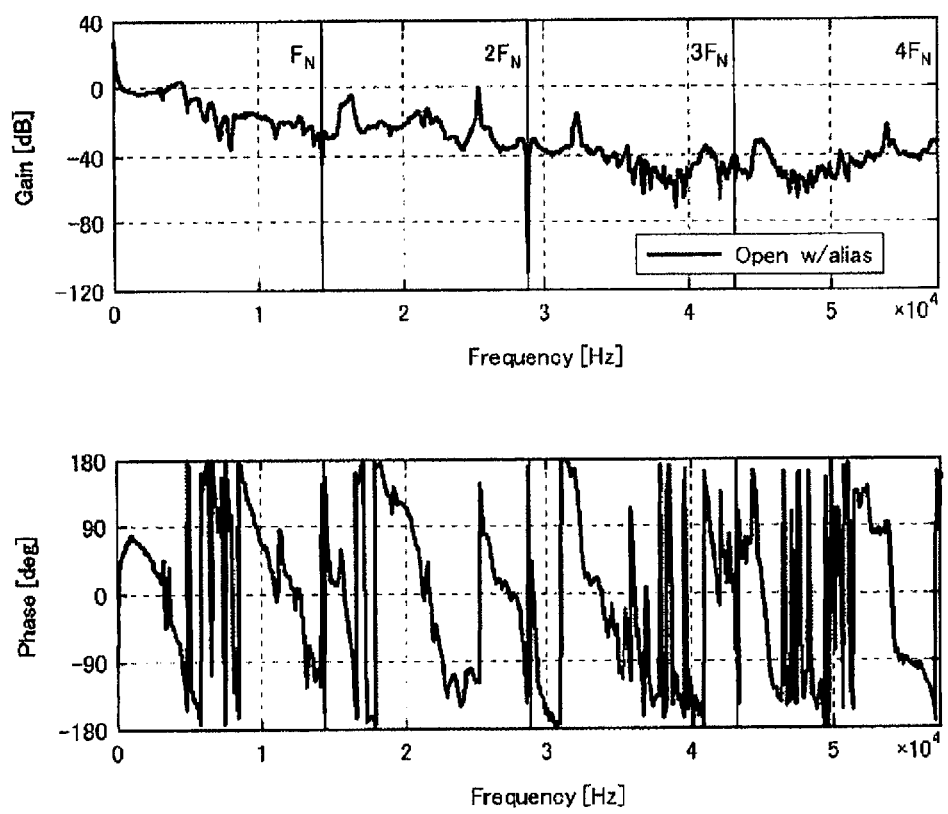
FIG. 17 shows an open loop characteristic measured in the experiment.
Figure 18:
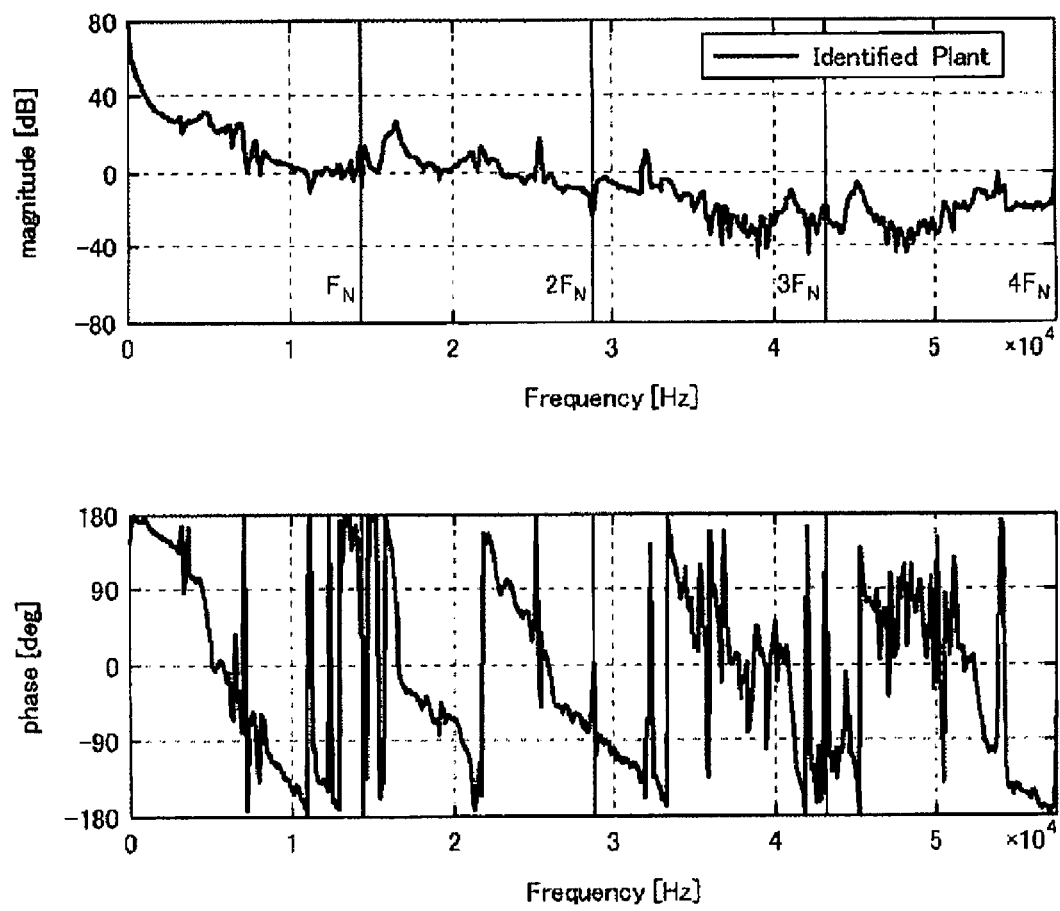
FIG. 18 shows $P_M(z)$ calculated in the experiment.

FIGS. 16-18 show results of experiments where the analysis method explained as the present embodiment is used in the actual analysis of a hard disk apparatus. In the experiments, a 3.5 inch hard disk having a rating rotation speed of 7200 rpm is used as a hard disk apparatus.

FIG. 16 shows a transfer characteristic of a multi-rate controller part measured by a hard disk apparatus used in an experiment. The controller performs multi-rate control at the multi-rate number M=4. In the present hard disk apparatus, the Nyquist frequency determined by the sampling period of the head position is 14,400 Hz. Hence, the sampling period is about 34.7 microseconds.

The controller has such a transfer characteristic of having a pole in 0 Hz, 7,000 Hz, and 8,000 Hz, and zero in 200 Hz and 1,000 Hz. In addition, the controller has a prewarped notch characteristic in the frequency of 5,092 Hz, 6,200 Hz, 7,000 Hz, 8,050 Hz, 14,400 Hz, and 17,000 Hz. Moreover, the controller obtains a multi-rate frequency signal by $0^{th}$-order hold interpolation.

FIG. 17 shows an open loop characteristic measured in the experiment. The measured open loop characteristic contains an aliasing component that appears by sampling at the frequency of $2F_N$.

FIG. 18 shows $P_M(z)$ calculated in the experiment. In the experiment, the hard disk apparatus in the actually used apparatus was able to calculate $P_M(z)$. This proves accurate evaluation of the actual mechanical resonance generated in the frequency band exceeding the Nyquist frequency.

The above description explains the analysis method of calculating $P_M(z)$ using any of the results of measuring the plant response, the open loop characteristic, the sensitivity function, the closed loop characteristic, and the settling function in combination with other transfer characteristics such as $C_s$. Examples of the other methods include a method of incorporating a notch filter into the angular frequency $\omega_0$ where an aliasing component of a disturbance signal appears. The single-rate processing section 202 is used to provide a notch characteristic to the frequency band where the disturbance signal appears as an aliasing component.

If the notch characteristic neglects the terms regarding $C_s$ ($\omega_0$) in Expressions (6), (7), and (8), the right hand side of Expression (6), the right hand side of Expression (7), and the right hand side of Expression (8) can be approximated to $-P_M(\omega_0)/M$, $-P_{Mp}(p^*,\omega_0)/M$, and $-P_{Mq}(q^*,\omega_0)/M$, respectively. Hence, the measured plant response value can be used as a direct index of $P_M$.

The similar notch characteristic may be provided to the multi-rate processing section 204. If the notch characteristic neglects the terms regarding $C^*_M(\omega_0)$, $C^*_{Mp}(p,\omega_0)$, and $C^*_{Mq}(q,\omega_0)$, the right hand side of Expression (6), the right hand side of Expression (7), and the right hand side of Expression (8) can be approximated to $-P_M(\omega_0)/M$, $-P_{Mp}(p^*,\omega_0)/M$, and $-P_{Mq}(q^*,\omega_0)/M$, respectively. Therefore, the measured plant response value can be used as a direct index of $P_M$. Note that providing either the single-rate processing section 202 or the multi-rate processing section 204 with a notch characteristic will realize direct calculation of $P_M$ by measuring the settling function. This is evident from Expressions (46), (48), and (50).

That is, the controller has a function of providing a notch characteristic for attenuating the signal component of the aliasing frequency to a signal between the input/output having, as an input, an error signal obtained by upsampling the error to the output frequency and a manipulated variable signal as an output. In this case, the response detection section 230 detects the input/output response of the control system in the aliasing frequency, from the ratio between the input/output signals of the output frequency having been detected with a signal containing a disturbance signal as an input and a signal containing the response of the controlled object and of which the signal component of the aliasing frequency is not attenuated as an output. The response detection section 230 detects the input/output response in the aliasing frequency, from at least one of the ratio between the error signal and the disturbance added signal detected as the input/output signals, and the ratio between the error signal and the disturbance signal detected as the input/output signals. Then, the transfer characteristic calculating section 240 calculates the transfer characteristic of the controlled object in the aliasing frequency, from the input/output response in the aliasing frequency.

As explained above, providing either the single-rate processing section 202 or the multi-rate processing section 204 with the notch characteristic enables calculation of $P_M$ in a specific frequency. For example, a notch filter having a notch characteristic in the specific frequency is incorporated to either the single-rate processing section 202 or the multi-rate processing section 204. Then, only when $P_M$ is calculated, a signal is allowed to pass through the notch filter. This realizes calculation of $P_M$ in the specific frequency.

In calculating $P_M$ in wider frequency bands, the analysis method corresponding to at least one of Expressions (21), (29), (37), (45), and (53) may be used, instead of controlling the notch characteristic. Usage of this analysis method enables calculation of $P_M$ in wider frequency bands, without changing the notch characteristic of the notch filter. Moreover, this analysis method simply requires solving linear equations, which prevents noticeable increase in manipulated variable in calculating $P_M$. Furthermore, the frequency of the disturbance signal can be allocated without changing the notch characteristic, which prevents changing the stability of the feedback loop depending on the change in frequency of the disturbance signal.

While the embodiments of the present invention have been described, the technical scope of the invention is not limited to the above described embodiments. It is apparent to persons skilled in the art that various alternations and improvements can be added to the above-described embodiments. It is also apparent from the scope of the claims that the embodiments added with such alternations or improvements can be included in the technical scope of the invention.

The operations, the processes, the steps, or the like in the apparatus, the system, the program, and the method described in the claims, the specification, and the drawings are not necessarily performed in the described order. The operations, the processes, the steps, or the like can be performed in an arbitrary order, unless the output of the former-described processing is used in the later processing. Even when expressions such as "First," or "Next," or the like are used to explain the operational flow in the claims, the specification, or the drawings, they are intended to facilitate the understanding of the invention, and are never intended to show that the described order is mandatory.

What is claimed is:

1. An evaluation apparatus for evaluating a transfer characteristic of a controlled object of a controller, the evaluation apparatus comprising:
a response detection section that detects an input/output response of a control system, based on a signal detected in the control system, the control system including the controller and the controlled object; and
a transfer characteristic calculating section that calculates the transfer characteristic of the controlled object, based at least on the input/output response,
wherein the controller receives an error between a detection value of a controlled variable sampled at a predetermined sampling frequency and a desired value of the controlled variable, and outputs a manipulated variable of the controlled object at an output frequency higher than the sampling frequency,
the controlled object is supplied with a disturbance added signal resulting from adding a disturbance signal having a frequency higher than a Nyquist frequency of the sampling frequency to a signal of the manipulated variable,
the response detection section detects the input/output response of the control system in an aliasing frequency to which a frequency component of the disturbance signal is folded by sampling at the sampling frequency, based on input/output signals of the output frequency detected with a signal including the disturbance signal as an input and a signal including the response of the controlled object as an output, and
the transfer characteristic calculating section calculates a transfer characteristic of the controlled object in the aliasing frequency, at least based on an input/output response in the aliasing frequency.

2. The evaluation apparatus according to claim 1, further comprising:
a transfer characteristic obtaining section that obtains a transfer characteristic of the controller in the aliasing frequency;
wherein the transfer characteristic calculating section calculates a transfer characteristic of the controlled object in the aliasing frequency, based on a transfer characteristic of the controller in the aliasing frequency and an input/output response in the aliasing frequency.

3. The evaluation apparatus according to claim 2, wherein the response detection section detects an input/output response of the controlled object in the aliasing frequency, based on the disturbance added signal and an error signal obtained by upsampling the error to the output frequency, which are detected as the input/output signals.

4. The evaluation apparatus according to claim 2, wherein the response detection section detects an open loop characteristic in the aliasing frequency as the input/output response, based on the disturbance added signal and the manipulated variable signal of the output frequency outputted from the controller, which are detected as the input/output signals.

5. The evaluation apparatus according to claim 2, wherein the response detection section detects a closed loop characteristic in the aliasing frequency as the input/output response, based on the disturbance signal and the manipulated variable signal of the output frequency outputted from the controller, which are detected as the input/output signals.

6. The evaluation apparatus according to claim 2, wherein the response detection section detects a sensitivity characteristic in the aliasing frequency as the input/output response, based on the disturbance added signal and the disturbance signal, which are detected as the input/output signals.

7. The evaluation apparatus according to claim 2, wherein the response detection section detects a settling characteristic in the aliasing frequency as the input/output response, based on the disturbance signal and an error signal obtained by upsampling the error to the output frequency, which are detected as the input/output signals.

8. The evaluation apparatus according to claim 1, wherein
the controller has a notch characteristic for attenuating a signal component at the aliasing frequency of a signal between an input and an output, the input being a point of an error signal obtained by upsampling the error to the output frequency, and the output being a point of a signal of the manipulated variable, the response detection section detects an input/output response of the control system in the aliasing frequency, from a ratio between input/output signals at the output frequency having been detected with (i) a signal containing the disturbance signal as an input and (ii) a signal containing a response of the controlled object and in which a signal component of the aliasing frequency is not attenuated as an output, and the transfer characteristic calculating section calculates a transfer characteristic of the controlled object in the aliasing frequency, from the input/output response in the aliasing frequency.

9. The evaluation apparatus according to claim 8, wherein
the response detection section detects the input/output response in the aliasing frequency, from at least one of a ratio between the error signal and the disturbance added signal detected as the input/output signals, and a ratio between the error signal and the disturbance signal detected as the input/output signals.

10. The evaluation apparatus according to claim 1, wherein
the response detection section detects the input/output response in the aliasing frequency in one or more frequency bands higher than the Nyquist frequency.

11. The evaluation apparatus according to claim 1, wherein
the disturbance added signal is generated by adding, to the signal of the manipulated variable, the disturbance signal corresponding to a sine wave of a frequency exceeding the Nyquist frequency.

12. The evaluation apparatus according to claim 1, wherein
the controlled object is a head apparatus having a head for reading data recorded on a disk, and the controlled variable corresponds to a position of the head with respect to the disk.

13. The evaluation apparatus according to claim 12, wherein
the disk has, in each track, a plurality of servo regions recording thereon servo information at a predetermined interval, and the head outputs a reading signal by reading the servo information recorded on each of the plurality of servo regions while the disk is rotated at a predetermined rotation speed, and a position of the head in the plurality of servo regions is detected at the predetermined sampling frequency, based on the reading signal of the servo information in each servo region.

* * * * *